United States Patent
Inoue

(10) Patent No.: US 8,103,423 B2
(45) Date of Patent: Jan. 24, 2012

(54) APPARATUS FOR AND METHOD OF CONTROLLING TRAVELING OF VEHICLE

(75) Inventor: Takuya Inoue, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 760 days.

(21) Appl. No.: 12/183,548

(22) Filed: Jul. 31, 2008

(65) Prior Publication Data

US 2009/0037071 A1 Feb. 5, 2009

(30) Foreign Application Priority Data

Aug. 3, 2007 (JP) ................................ 2007-203232

(51) Int. Cl.
*B60T 8/32* (2006.01)
(52) U.S. Cl. .......................................... 701/93; 701/96
(58) Field of Classification Search ............. 701/93, 701/96
See application file for complete search history.

(56) References Cited

U.S. PATENT DOCUMENTS

| 5,053,979 | A * | 10/1991 | Etoh | ............................. 700/304 |
| 6,246,948 | B1 | 6/2001 | Thakker | |
| 6,324,462 | B1 * | 11/2001 | Kageyama | ........................ 701/93 |
| 6,370,470 | B1 * | 4/2002 | Yamamura et al. | ............... 701/96 |
| 6,389,351 | B1 * | 5/2002 | Egawa et al. | ..................... 701/93 |
| 7,660,658 | B2 * | 2/2010 | Sheynblat | ........................ 701/93 |
| 2002/0022920 | A1 | 2/2002 | Straub | |
| 2002/0173881 | A1 | 11/2002 | Lash et al. | |
| 2009/0037071 | A1 * | 2/2009 | Inoue | ............................... 701/96 |

FOREIGN PATENT DOCUMENTS

| JP | 2006-321354 A | 11/2006 |
| WO | WO 02/098695 A1 | 12/2002 |

* cited by examiner

*Primary Examiner* — Paul N Dickson
*Assistant Examiner* — Marlon Arce
(74) *Attorney, Agent, or Firm* — Foley & Lardner LLP

(57) ABSTRACT

An adaptive cruise traveling control system is configured to control a speed of a host vehicle at a basic speed-control mode at which a set vehicle speed is set as a desired vehicle speed for an adaptive cruise traveling control function. The adaptive cruise traveling control system is also configured to control the host vehicle speed at a driver-intervention speed-control mode at which a limited vehicle speed of a road, on which the host vehicle is traveling, is set as the desired vehicle speed, when the desired vehicle speed has been set to the limited vehicle speed manually by a driver's operation made to a man-machine interface, under a condition where the limited vehicle speed has been detected.

11 Claims, 11 Drawing Sheets

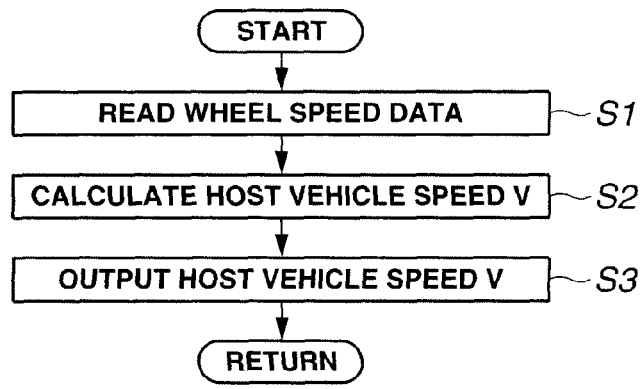
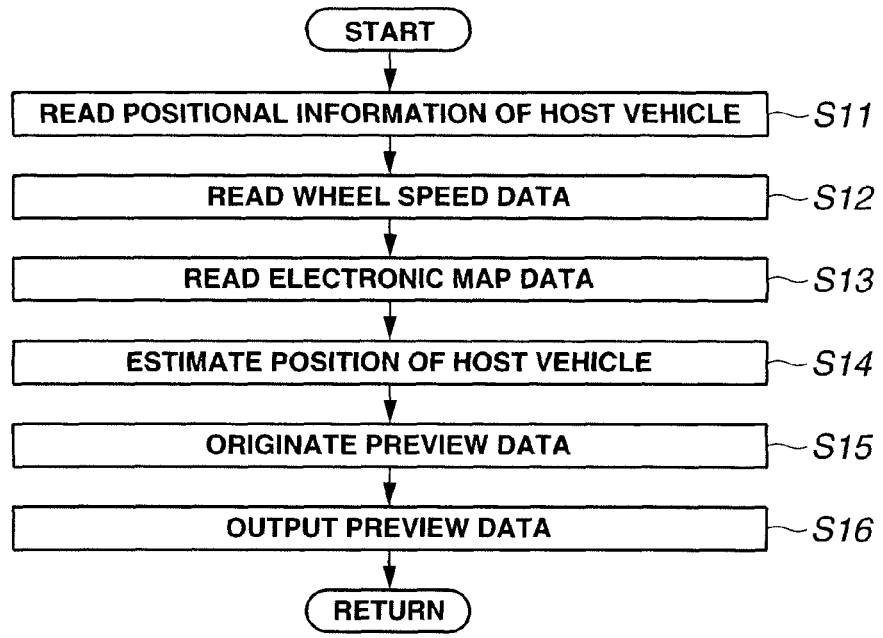
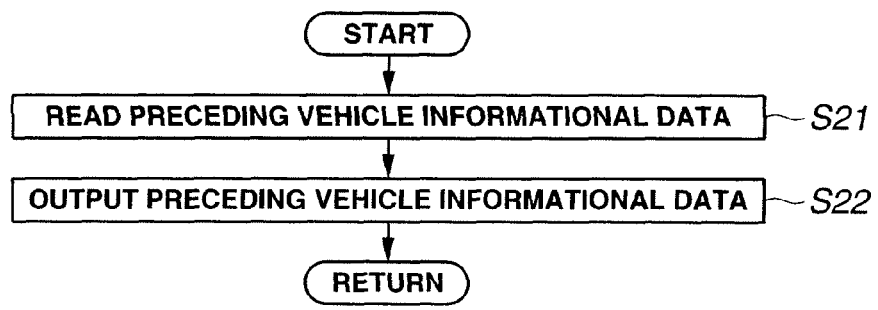

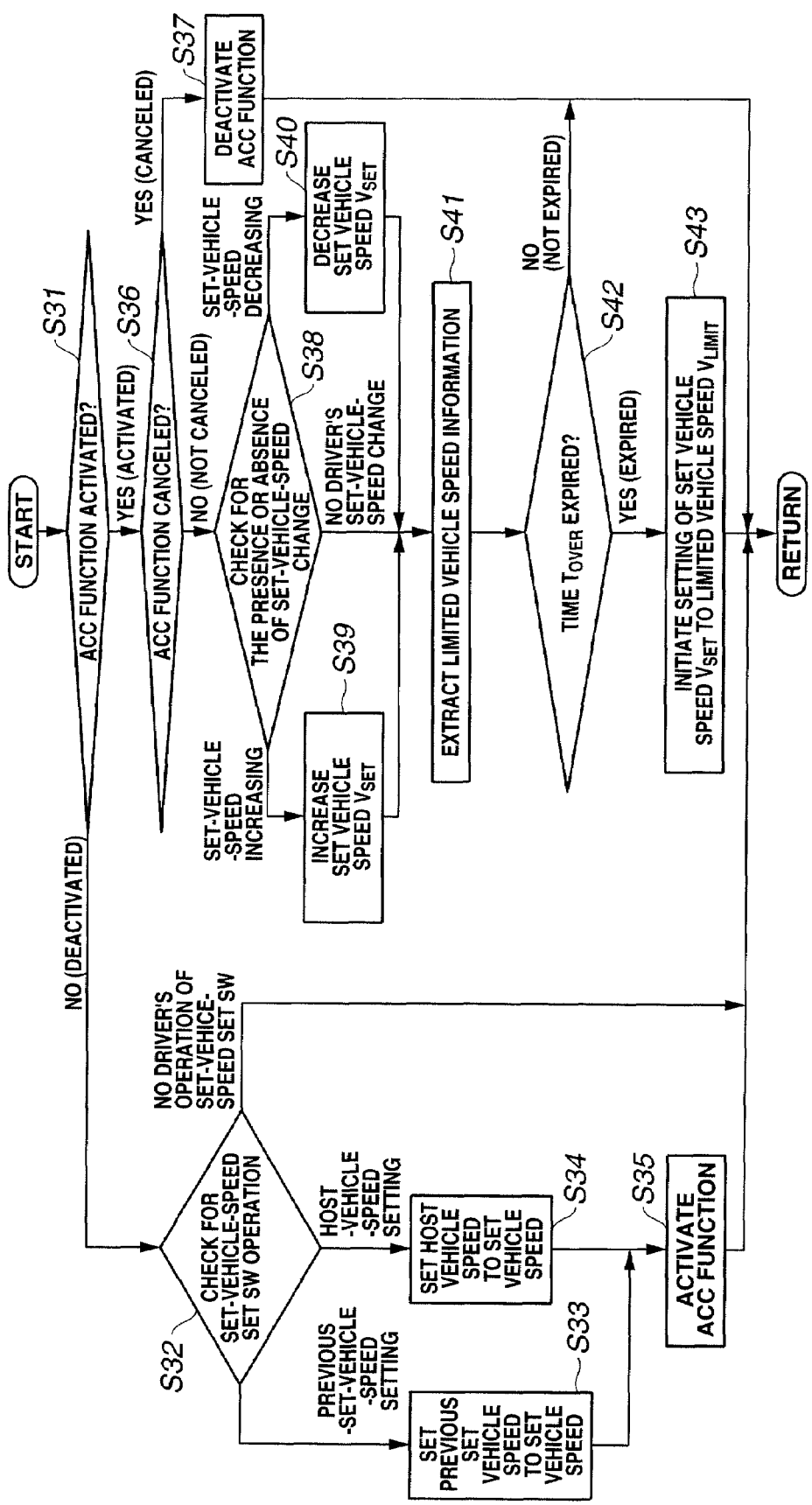

APPARATUS FOR AND METHOD OF CONTROLLING TRAVELING OF VEHICLE

TECHNICAL FIELD

The present invention relates to an apparatus for and a method of controlling traveling of a vehicle, which is configured to control a travel speed of a host vehicle, based on a set vehicle speed and/or a limited vehicle speed of the host vehicle's driving lane, which limited vehicle speed is obtained as navigation information.

BACKGROUND ART

In recent years, there have been proposed and developed various adaptive cruise control (ACC) technologies. One such ACC technology has been disclosed in Japanese Patent Provisional Publication No. 2006-321354 (hereinafter is referred to as "JP2006-321354"). The adaptive cruise traveling control system disclosed in JP2006-321354 is configured to execute three different traveling control functions, that is, (i) a first traveling control function (i.e., a cruise control function, namely, cruise-set-speed control at a set vehicle speed set by the driver), (ii) a second traveling control function (i.e., a so-called "following control" that a host vehicle follows a preceding vehicle, while keeping the host vehicle's distance from the preceding vehicle at an approximately constant vehicle-to-vehicle distance, and (iii) a third traveling control function that adjusts the host vehicle speed to an appropriate speed based on road information (in particular, limited vehicle speed information) from a navigation device). When a set vehicle speed exceeds a limited vehicle speed, the adaptive cruise traveling control system disclosed in JP2006-321354 informs the driver about "overspeed" (the set vehicle speed exceeding the limited vehicle speed). If the driver does not change the set vehicle speed for a predetermined elapsed time, measured from the point of time when the "overspeed" information has been outputted to the driver, then the adaptive cruise traveling control system automatically changes the set vehicle speed to the limited vehicle speed, without driver intervention.

SUMMARY OF THE INVENTION

However, the cruise traveling control system disclosed in JP2006-321354 requires the aforementioned predetermined elapsed time (i.e., a constant delay time or a constant waiting time, measured from the point of time when the set vehicle speed has exceeded the limited vehicle speed), until an automatic change from set vehicle speed to limited vehicle speed occurs. Such a constant delay time (a constant waiting time) would be likely to cause the driver to feel considerable discomfort. Furthermore, even when limited vehicle speed information, detected by the adaptive cruise traveling control system via the navigation device, is erroneous input information, the conventional adaptive cruise traveling control system automatically sets the set vehicle speed to the erroneously-detected limited vehicle speed, regardless of a driver's wishes. Such an automatic change from set vehicle speed to limited vehicle speed, initiated due to the erroneous input information, would also be likely to cause the driver to feel discomfort.

For the reasons discussed above, it would be desirable that an adaptive cruise control (ACC) system permits an ACC vehicle, often called "host vehicle", to travel at a limited vehicle speed, in accord with a driver's wishes.

It is, therefore, in view of the previously-described disadvantages of the prior art, an object of the invention to provide an apparatus for and a method of controlling traveling of a host vehicle, which is configured to permit the host vehicle to travel at a limited vehicle speed, in accord with a driver's wishes.

In order to accomplish the aforementioned and other objects of the present invention, an apparatus for controlling traveling of a vehicle, comprises a set vehicle speed detector configured to detect a set vehicle speed, a limited vehicle speed detector configured to detect a limited vehicle speed of a road, on which a host vehicle is traveling, a man-machine interface configured to set a desired vehicle speed by a driver's operation made to the man-machine interface, which operation is detected by a driver's operation detector configured to detect the driver's operation made to the man-machine interface, a desired vehicle speed setting section configured to set a determined desired vehicle speed based on the set vehicle speed, the limited vehicle speed, and the desired vehicle speed, and a control device configured to control a speed of the host vehicle in a manner so as to bring the host vehicle speed closer to the determined desired vehicle speed.

According to another aspect of the invention, an apparatus for controlling traveling of a vehicle, comprises a set vehicle speed detector configured to detect a set vehicle speed, a limited vehicle speed detector configured to detect a limited vehicle speed of a road, on which a host vehicle is traveling, a man-machine interface configured to set a desired vehicle speed to the limited vehicle speed manually by a driver's operation made to the man-machine interface, a driver's operation detector configured to detect the driver's operation made to the man-machine interface, a desired vehicle speed setting section configured to set the desired vehicle speed basically to the set vehicle speed, and also configured to set the desired vehicle speed to the limited vehicle speed, based on a result of detection of the driver's operation made to the man-machine interface, under a condition where the limited vehicle speed has been detected by the limited vehicle speed detector, and a control device configured to control a speed of the host vehicle in a manner so as to bring the host vehicle speed closer to the desired vehicle speed.

According to another aspect of the invention, a method of controlling traveling of a vehicle, comprises controlling a speed of a host vehicle at a first speed-control mode at which a set vehicle speed is set as a desired vehicle speed, and controlling the host vehicle speed at a second speed-control mode at which a limited vehicle speed of a road, on which the host vehicle is traveling, is set as the desired vehicle speed, when the desired vehicle speed has been set to the limited vehicle speed manually by a driver's operation made to a man-machine interface, under a condition where the limited vehicle speed has been detected.

BRIEF DESCRIPTION OF THE DRAWINGS

FIG. 2 is a flowchart illustrating a procedure executed within a host vehicle speed acquisition section of the ACC system of the first embodiment.

FIG. 3 is a flowchart illustrating a procedure executed within a navigation device of the ACC system of the first embodiment.

FIG. 4 is a flowchart illustrating a procedure executed within a preceding vehicle information acquisition section of the ACC system of the first embodiment.

FIG. 5 is a flowchart of a procedure executed within a cruise vehicle speed setting section of an adaptive cruise traveling control (ACC) system of a comparative example that utilizes a constant delay time for initiating a change from set vehicle speed to limited vehicle speed.

DESCRIPTION OF THE PREFERRED EMBODIMENTS

First Embodiment

Figure 1:
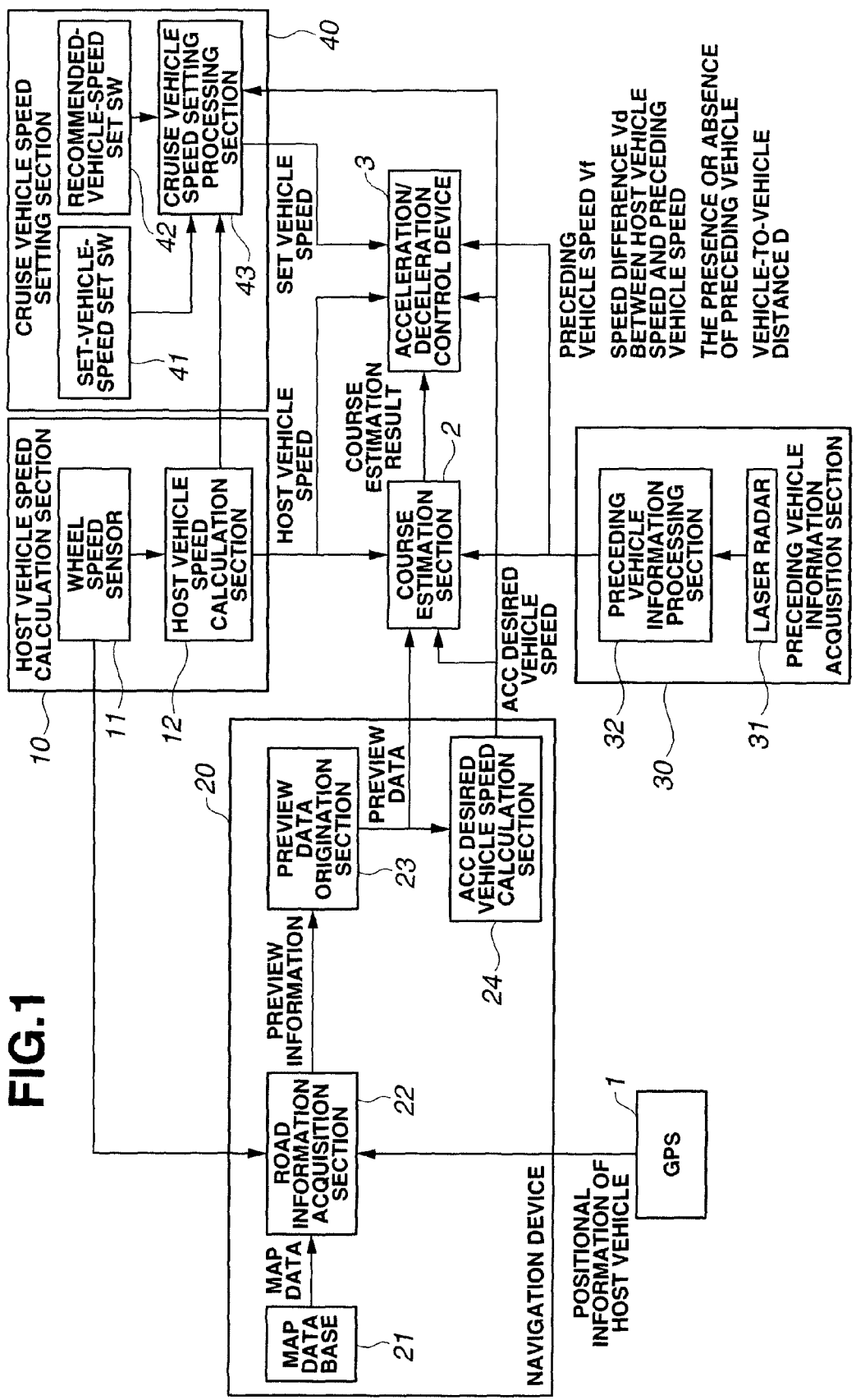
FIG. 1 is a block diagram illustrating a system configuration of a first embodiment of an adaptive cruise traveling control (ACC) system.

Referring now to the drawings, particularly to FIG. 1, the adaptive cruise traveling control (ACC) system configuration of the first embodiment is exemplified in a rear-wheel-drive, four-wheeled automotive vehicle. As shown in FIG. 1, the ACC system of the first embodiment is provided with a global positioning system (GPS) 1, a course estimation section 2, an acceleration/deceleration control device 3, a host vehicle speed acquisition section 10, a navigation device 20, a preceding vehicle information acquisition section 30, and a cruise vehicle speed setting section 40.

Host vehicle speed acquisition section 10 includes a wheel speed sensor 11 and a host vehicle speed calculation section 12. Wheel speed sensor 11 is provided for detecting the speed of each wheel on the vehicle. Host vehicle speed calculation section 12 calculates a travel speed of a host vehicle (i.e., host vehicle speed, denoted by "V") based on the wheel speed signal from wheel speed sensor 11. Host vehicle speed calculation section 12 outputs a signal indicative of the calculated host vehicle speed to each of course estimation section 2, acceleration/deceleration control device 3, and cruise vehicle speed setting section 40, exactly, a cruise vehicle speed setting processing section 43 (described later).

Referring now to FIG. 2, there is shown the procedure executed within host vehicle speed acquisition section 10. The host vehicle speed arithmetic processing shown in FIG. 2 is executed as time-triggered interrupt routines to be triggered every predetermined sampling time intervals such as 10 milliseconds.

As seen from the flowchart of FIG. 2, at step S1, host vehicle speed calculation section 12 reads wheel speeds detected by wheel speed sensor 11. For instance, in the case of the rear-wheel-drive vehicle, input information about front-left and front-right wheel speeds Vw1 and Vw2 are read.

At step S2, host vehicle speed calculation section 12 calculates host vehicle speed V based on the wheel-speed information data signals read through step S1. For instance, in the case of the rear-wheel-drive vehicle, host vehicle speed V is arithmetically calculated as a simple average of front wheel speeds Vw1 and Vw2 from the following equation (1).

$$V=(Vw1+Vw2)/2 \qquad (1)$$

At step S3, host vehicle speed calculation section 12 outputs a signal indicative of host vehicle speed V (calculated through step S2) to each of course estimation section 2, acceleration/deceleration control device 3, and cruise vehicle speed setting section 40 (exactly, cruise vehicle speed setting processing section 43).

In this manner, one execution cycle of the host vehicle speed arithmetic processing of FIG. 2 terminates.

Navigation device 20 stores a map database (DB) 21 and also includes a road information acquisition section 22, a preview data origination section 23, and an adaptive-cruise-traveling-control desired vehicle speed calculation section (simply, an ACC desired vehicle speed calculation section) 24. Road information acquisition section 22 is configured to estimate or specify a position of the host vehicle on the map data, based on the electric map data retrieved from map database 21, the positional information of the host vehicle, detected by means of GPS 1, and the wheel-speed sensor signals from wheel speed sensor 11. Road information acquisition section 22 is further configured to acquire, based on both the map data retrieved from map database 21 and the specified position of the host vehicle on the map data, road information about a road ahead of the host vehicle and also including the currently-specified host vehicle's position, as preview information. Thereafter, road information acquisition section 22 outputs the acquired preview information to preview data origination section 23.

Preview data origination section 23 is configured to detect, based on the preview information obtained through road information acquisition section 22, forward road information, concretely, a road classification, coordinates of nodes, a link classification, a road width, the number of lanes, the presence or absence of a branch node, guidepath information, a limited vehicle speed, denoted by "$V_{LIMIT}$", and the like. Preview data origination section 23 originates, based on the detected forward road information, a preview data in a predetermined format. Preview data origination section 23 outputs the originated preview data to each of ACC desired vehicle speed calculation section 24 and course estimation section 2.

ACC desired vehicle speed calculation section 24 calculates, based on the preview data originated by preview data origination section 23, an adaptive-cruise-traveling-control desired vehicle speed (simply, an ACC desired vehicle speed, denoted by "$V_T$", more simply, a desired vehicle speed) at each of points within the originated preview. ACC desired vehicle speed calculation section 24 outputs the calculated ACC desired vehicle speed to each of course estimation section 2, acceleration/deceleration control device 3, and cruise vehicle speed setting section 40 (exactly, cruise vehicle speed setting processing section 43). Navigation device 20 outputs various information, containing the calculated ACC desired vehicle speed, to each of course estimation section 2, acceleration/deceleration control device 3, and cruise vehicle speed setting section 40 (exactly, cruise vehicle speed setting processing section 43).

Referring now to FIG. 3, there is shown the procedure executed within navigation device 20. The preview data origination processing shown in FIG. 3 is also executed as time-triggered interrupt routines to be triggered every predetermined sampling time intervals.

As seen from the flowchart of FIG. 3, at step S11, road information acquisition section 22 reads positional information of the host vehicle. More concretely, road information acquisition section 22 reads latitude-and-longitude information of the host vehicle detected by use of GPS 1.

At step S12, road information acquisition section 22 reads wheel speeds. Concretely, input information about wheel-speed signals generated from wheel-speed sensor 11 is read.

At step S13, road information acquisition section 22 reads the electronic map data. Concretely, road information acquisition section 22 reads or retrieves the map data in a constant distance range from the host vehicle, from map database 21.

At step S14, road information acquisition section 22 estimates or specifies a position of the host vehicle. Concretely, road information acquisition section 22 estimates or specifies a position of the host vehicle, based on the latitude-and-longitude information of the host vehicle (read through step S11), the wheel-speed information (read through step S12), and the map data (read through step S13).

At step S15, preview data origination section 23 originates a preview data. Concretely, preview data origination section 23 detects, based on the map data (read through step S13) and the positional information of the host vehicle (estimated through step S14), forward road information in a predetermined range from the currently-specified host vehicle's position to a constant distance L ahead of the currently-specified host vehicle's position, and then originates a preview data concerning the forward road information about a road in front of the host vehicle and also including the currently-specified host vehicle's position. For instance, as the forward road information, preview data origination section 23 detects a road classification, a branching-off angle, a distance to a branch node, GPS information, a node classification, a transitional distance between the currently-specified host vehicle's position and the node, limited vehicle speed $V_{LIMIT}$, coordinates of nodes, a link classification, a link angle, the number of branches, and a linked relation between a certain node and another node. Thereafter, preview data origination section 23 originates, based on the detected forward road information, a preview data in a predetermined format.

At step S16, preview data origination section 23 outputs the preview data (originated through step S15) to each of ACC desired vehicle speed calculation section 24 and course estimation section 2.

In this manner, one execution cycle of the preview data origination processing of FIG. 3 terminates.

As discussed above, navigation device 20 originates a preview data, based on the map data and the host vehicle's positional information, and then outputs the originated preview data to each of ACC desired vehicle speed calculation section 24 and course estimation section 2. Additionally, navigation device 20 outputs various information, which information contains information about ACC desired vehicle speed $V_T$ at each of points within the originated preview, calculated based on the originated preview data by means of ACC desired vehicle speed calculation section 24, to each of course estimation section 2, acceleration/deceleration control device 3, and cruise vehicle speed setting section 40 (exactly, cruise vehicle speed setting processing section 43).

Preceding vehicle information acquisition section 30 includes a laser radar (exactly, a scanning laser radar sensor) 31 and a preceding vehicle information processing section 32. Preceding vehicle information acquisition section 30 is configured to detect a preceding vehicle, based on an output signal from laser radar 31. When a preceding vehicle has been detected, preceding vehicle information processing section 32 is further configured to calculate the host vehicle's distance from the detected preceding vehicle, often called an "inter-vehicle distance" or a "vehicle-to-vehicle distance", and a difference (that is, a relative speed) between the host vehicle speed and the preceding vehicle speed. Preceding vehicle information acquisition section 30 outputs information about the calculated vehicle-to-vehicle distance and the calculated relative speed to each of course estimation section 2 and acceleration/deceleration control device 3.

Referring now to FIG. 4, there is shown the procedure executed within preceding vehicle information acquisition section 30. The preceding vehicle information processing shown in FIG. 4 is executed as time-triggered interrupt routines to be triggered every predetermined sampling time intervals.

As seen from the flowchart of FIG. 4, at step S21, preceding vehicle information processing section 32 obtains preceding vehicle information, based on an output signal from laser radar 31. Concretely, as the preceding vehicle information concerning the preceding vehicle traveling on the same lane as the host vehicle, preceding vehicle information processing section 32 obtains a preceding vehicle acquisition flag, a preceding vehicle speed Vf, a speed difference Vd between the host vehicle speed V and the preceding vehicle speed Vf, and a vehicle-to-vehicle distance D between the preceding vehicle and the host vehicle.

At step S22, preceding vehicle information processing section 32 outputs the preceding vehicle information about the preceding vehicle acquisition flag, speed difference Vd, and vehicle-to-vehicle distance D, to each of course estimation section 2 and acceleration/deceleration control device 3.

In this manner, one execution cycle of the preceding vehicle information processing of FIG. 4 terminates.

As discussed above, preceding vehicle information acquisition section 30 obtains the preceding vehicle acquisition flag, speed difference Vd, and vehicle-to-vehicle distance D, by use of laser radar 31, and then outputs these informational data (the preceding vehicle acquisition flag, speed difference Vd, and vehicle-to-vehicle distance D) to each of course estimation section 2 and acceleration/deceleration control device 3.

Course estimation section 2 estimates a course of the host vehicle, based on (i) input information about host vehicle speed V calculated or obtained through host vehicle speed acquisition section 10, (ii) the forward road information (concretely, a road classification, coordinates of nodes, main lane information, a road width, the number of lanes, the presence or absence of a branch node, guidepath information, limited vehicle speed $V_{LIMIT}$, ACC desired vehicle speed $V_T$, and the like) obtained by navigation device 20, and (iii) the preceding vehicle information (concretely, the presence or absence of the preceding vehicle existing ahead of the host vehicle, vehicle-to-vehicle distance D, and speed difference Vd) obtained by preceding vehicle information acquisition section 30. Course estimation section 2 outputs the estimated course information (i.e., the estimation result for the course of the host vehicle) to acceleration/deceleration control device 3.

Cruise vehicle speed setting section 40 includes a set-vehicle-speed SET switch 41, a recommended-vehicle-speed SET switch 42, and cruise vehicle speed setting processing section 43.

Set-vehicle-speed SET switch 41 (serving as a man-machine interface), which includes an output section generating a signal indicative of a driver's operation made to this switch, outputs driver's set-vehicle-speed SET switch operation information about (i) driver-operated host-vehicle-speed setting, (ii) driver-operated previous-set-vehicle-speed setting, (iii) driver-operated set-vehicle-speed increasing/decreasing (driver-operated set-vehicle-speed incrementing/decrementing) and the like, to cruise vehicle speed setting processing section 43. Here, the driver-operated host-vehicle-speed setting is a driver's operation that sets a set vehicle speed, denoted by "$V_{SET}$", for the adaptive cruise traveling control function (cruise traveling control), simply, "ACC function" to the current host vehicle speed, obtained by host vehicle speed acquisition section 10 at the current execution cycle. The driver-operated previous-set-vehicle-speed setting is a driver's operation that sets a set vehicle speed, denoted by "$V_{SET}$", for instance at the point of time when cruise traveling control has recovered (resumed), to the previous set vehicle speed, denoted by "$V_{SET(OLD)}$". The driver-operated set-vehicle-speed increasing is a driver's operation that increases or increments set vehicle speed $V_{SET}$ for cruise traveling control. In a similar manner, the driver-operated set-vehicle-speed decreasing is a driver's operation that decreases or decrements set vehicle speed $V_{SET}$ for cruise traveling control.

Recommended-vehicle-speed SET switch 42 (serving as a man-machine interface), which includes an output section generating a signal indicating a driver's operation, outputs driver's recommended-vehicle-speed SET switch operation information. For instance, recommended-vehicle-speed SET switch 42 is constructed by a button, a lever, or a touch panel switch of a touch panel that displays navigation information.

Cruise vehicle speed setting processing section 43 sets a set vehicle speed, denoted by "$V_{SET}$", for cruise traveling control, based on both (i) the driver's set-vehicle-speed SET switch operation information (an operational signal) from set-vehicle-speed SET switch 41 and (ii) the driver's recommended-vehicle-speed SET switch operation information (an operational signal) from recommended-vehicle-speed SET switch 42. Cruise vehicle speed setting processing section 43 outputs the set vehicle speed information to acceleration/deceleration control section 3.

Referring now to FIG. 5, there is shown the procedure executed within cruise vehicle speed setting section 40 (in particular, cruise vehicle speed setting processing section 43). The cruise vehicle speed setting processing shown in FIG. 5 is executed as time-triggered interrupt routines to be triggered every predetermined sampling time intervals. However, note that the procedure of FIG. 5 indicates a fundamental procedure performed by an adaptive cruise traveling control (ACC) system of a comparative example that utilizes a constant delay time Tover (described later in reference to step S42 of FIG. 5) for initiating a change from set vehicle speed $V_{SET}$ to limited vehicle speed $V_{LIMIT}$, in order to realize the ACC function.

As seen from the flowchart shown in FIG. 5, at step S31, a check is made to determine whether the ACC function (i.e., cruise traveling control) is activated (ON) or deactivated (OFF). When the ACC function is activated (ON), the routine proceeds to step S36. Conversely when the ACC function is deactivated (OFF), the routine proceeds to step S32.

At step S32, a check is made to determine, based on the driver's set-vehicle-speed SET switch operation information (an operational signal) from set-vehicle-speed SET switch 41, whether set-vehicle-speed SET switch 41 is operated by the driver. Additionally, in the presence of the driver's set-vehicle-speed SET switch operation, a further check is made to determine whether the driver's set-vehicle-speed SET switch operation corresponds to (i) driver-operated host-vehicle-speed setting or (ii) driver-operated previous-set-vehicle-speed setting. When the driver's set-vehicle-speed SET switch operation corresponds to the driver-operated previous-set-vehicle-speed setting, the routine flows from step S32 to step S33. Conversely when the driver's set-vehicle-speed SET switch operation corresponds to the driver-operated host-vehicle-speed setting, the routine flows from step S32 to step S34. In the absence of the driver's set-vehicle-speed SET switch operation, one execution cycle of the cruise vehicle speed setting processing of FIG. 5 terminates.

At step S33, the previous set vehicle speed $V_{SET(OLD)}$, set with the ACC function activated previously, is read. The previous set vehicle speed $V_{SET(OLD)}$ is set to the current value (denoted by "$V_{SET(NEW)}$") of set vehicle speed $V_{SET}$. In other words, the previous set vehicle speed $V_{SET(OLD)}$ is set as a new set vehicle speed $V_{SET(NEW)}$ for the ACC function (cruise traveling control). Thereafter, step S35 occurs.

At step S34, the current value of host vehicle speed V, calculated or obtained through host vehicle speed acquisition section 10, is set to a set vehicle speed, denoted by $V_{SET}$. In other words, the current host vehicle speed is set as a new set vehicle speed $V_{SET(NEW)}$ for the current ACC function. Thereafter, step S35 occurs.

At step S35, the ACC function becomes activated (ON), and then one execution cycle of the cruise vehicle speed setting processing of FIG. 5 terminates.

At step S36, a check is made to determine whether the ACC function is canceled by the driver. For instance, driver braking (the driver's brake-pedal depression) or switching OFF the ACC function by the driver with a cancel switch, which is provided to cancel (deactivate) the ACC function, corresponds to cancellation of the ACC function by the driver. When the ACC function is canceled by the driver, the routine proceeds to step S37. Conversely when the ACC function is not canceled by the driver, the routine proceeds to step S38.

At step S37, the ACC function becomes deactivated (OFF), and then one execution cycle of the cruise vehicle speed setting processing of FIG. 5 terminates.

At step S38, a check is made to determine whether the driver-operated set-vehicle-speed change (the driver-operated set-vehicle-speed increasing/decreasing) occurs. In the presence of the driver-operated set-vehicle-speed change, a further check is made to determine whether the driver-operated set-vehicle-speed change corresponds to (i) driver-operated set-vehicle-speed increasing or (ii) driver-operated set-vehicle-speed decreasing. In the case of the driver-operated set-vehicle-speed increasing, the routine flows from step S38 to step S39. Conversely in the case of the driver-operated set-vehicle-speed decreasing, the routine flows from step S38 to step S40. In the absence of the driver-operated set-vehicle-speed change, the routine flows from step S38 to step S41.

At step S39, the set vehicle speed for the ACC function is increased (incremented) by a constant speed value Vup, such as 5 km/h. Thereafter, the routine advances to step S41.

At step S40, set vehicle speed $V_{SET}$ for the ACC function is decreased (decremented) by a constant speed value Vdown, such as 5 km/h. Thereafter, the routine advances to step S41.

At step S41, limited-vehicle-speed information is extracted from the forward road information obtained through navigation device 20. Thereafter, step S42 occurs.

At step S42, a check is made to determine, based on both the host-vehicle-speed information obtained through host vehicle speed acquisition section 10 and the limited-vehicle-speed information obtained through step S41, whether a state of host vehicle speed V exceeding the detected limited vehicle speed $V_{LIMIT}$ continues for a predetermined time duration (in other words, a constant delay time) Tover, such as 10 seconds. When the state of host vehicle speed V exceeding limited vehicle speed $V_{LIMIT}$ continues for the predetermined time duration Tover, the routine proceeds to step S43. Note that, as described later in reference to the flowchart of FIG. 6, the process of this step S42, performed by the ACC system of the comparative example shown in FIG. 5, is replaced by steps S63-S64 (in particular, step S64) in the ACC system of the first embodiment.

At step S43, set vehicle speed $V_{SET}$ for the ACC function is set to the detected limited vehicle speed $V_{LIMIT}$. In this manner, one execution cycle of the cruise vehicle speed setting processing of FIG. 5 terminates.

According to the previously-discussed cruise vehicle speed setting processing of the ACC system of the comparative example shown in FIG. 5, when the ACC function is deactivated (OFF) and the previous-set-vehicle-speed setting is made by the driver via set-vehicle-speed SET switch 41, the previous set vehicle speed, set with the ACC function activated previously, is set to a set vehicle speed for the ACC function at the current cycle, and then the ACC function becomes activated (ON) (see the flow from step S31 through steps S32 and S33 to step S35). When the ACC function is deactivated (OFF) and the host-vehicle-speed setting is made by the driver via set-vehicle-speed SET switch 41, the current host vehicle speed V is set to a set vehicle speed for the ACC function at the current cycle, and then the ACC function becomes activated (ON) (see the flow from step S31 through steps S32 and S34 to step S35). In contrast, in the case that there is no driver's set-vehicle-speed SET switch operation under a condition where the ACC function is deactivated (OFF), the set-vehicle-speed setting processing as previously discussed is not made (see the termination of one cycle of the routine after the flow from step S31 to step S32).

Furthermore, according to the previously-discussed cruise vehicle speed setting processing of the ACC system of the comparative example shown in FIG. 5, when the ACC function is canceled by the driver under a condition where the ACC function is activated (ON), the ACC function becomes deactivated (OFF) (see the flow from step S31 through step S36 to step S37). When a set-vehicle-speed change (a set-vehicle-speed increase/decrease) is made by the driver via set-vehicle-speed SET switch 41 under a condition where the ACC function is activated (ON), the set vehicle speed is changed (increased or decreased) according to the driver-operated set-vehicle-speed increasing/decreasing (see the flow from step S31 through step S36 via step S38 to either one of steps S39-S40). Moreover, in the case of the system of the comparative example shown in FIG. 5, the limited-vehicle-speed information is extracted or obtained through navigation device 20 and then host vehicle speed V is compared to the extracted limited vehicle speed. Note that according to the system of the comparative example, the set vehicle speed is set to the limited vehicle speed, when the predetermined time duration (the constant delay time) Tover, during which host vehicle speed V continuously exceeds the limited vehicle speed, has expired. In other words, according to the system of the comparative example, the set vehicle speed cannot be set to the limited vehicle speed, until the predetermined time duration (the constant delay time) Tover, during which host vehicle speed v continuously exceeds the limited vehicle speed, expires.

Acceleration/deceleration control device 3 controls the host vehicle, in such a manner that the host vehicle is accelerated or decelerated based on the host vehicle speed V obtained through host vehicle speed acquisition section 10, the ACC desired vehicle speed obtained through navigation device 20 (in particular, ACC desired vehicle speed calculation section 24), the set vehicle speed for the ACC function obtained through cruise vehicle speed setting section 40 (in particular, cruise vehicle speed setting processing section 43), speed difference Vd obtained by preceding vehicle information acquisition section 30, and the estimated course information (i.e., the estimation result of the course of the host vehicle) obtained by course estimation section 2.

Figure 6:
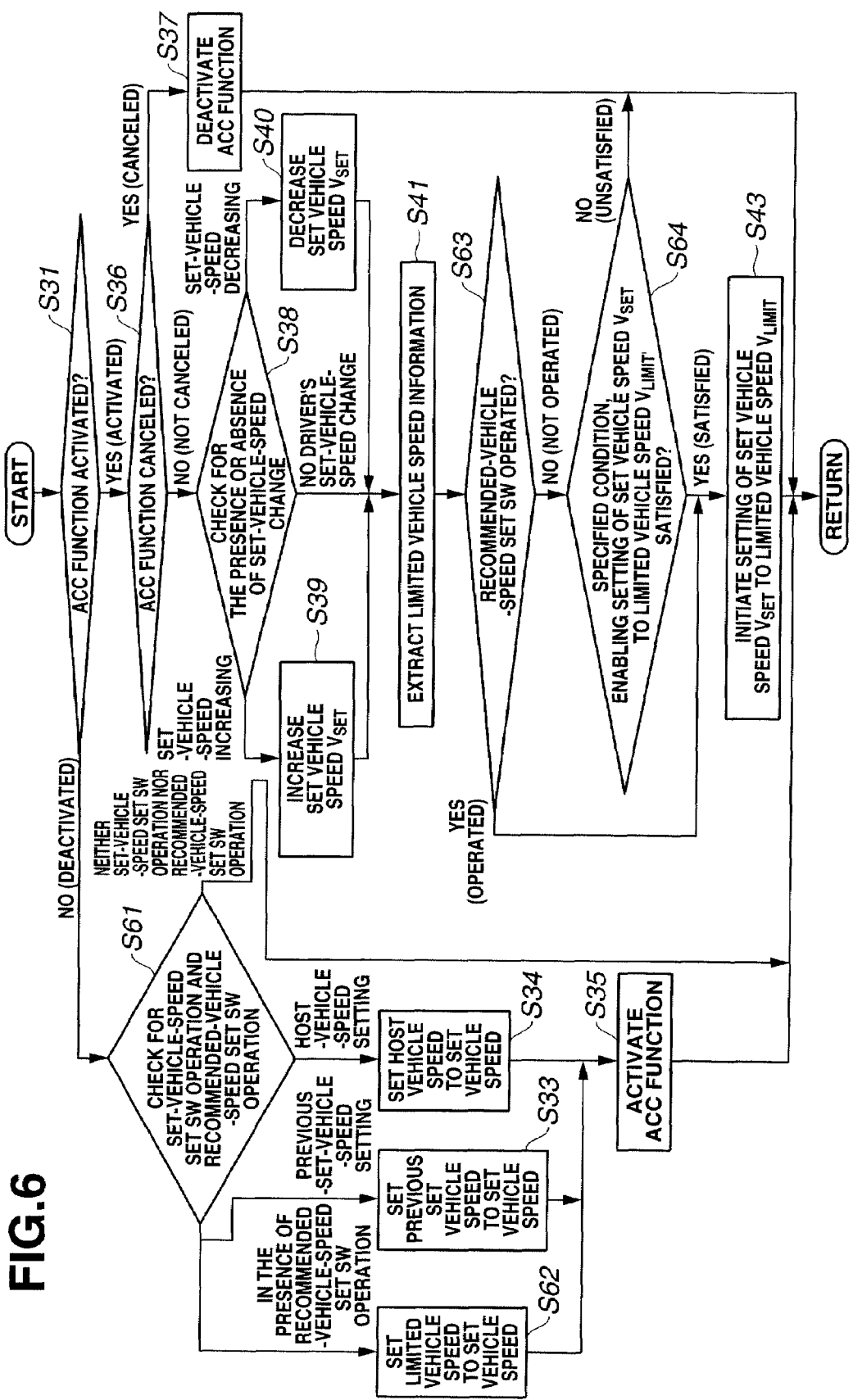
FIG. 6 is a flowchart illustrating a procedure executed within a cruise vehicle speed setting section of the ACC system of the first embodiment.

Referring now to FIG. 6, there is shown the improved procedure executed within cruise vehicle speed setting section 40 (in particular, cruise vehicle speed setting processing section 43) incorporated in the ACC system of the first embodiment. The improved processing shown in FIG. 6 is also executed as time-triggered interrupt routines to be triggered every predetermined sampling time intervals. As can be seen from comparison between the two routines shown in FIGS. 5-6, the improved processing of FIG. 6 is similar to the processing of FIG. 5, except that in the improved procedure shown in FIG. 6, steps S62-S63 are added, step S42 of FIG. 5 is replaced by step S64, and also step S32 of FIG. 5 is replaced by step S61. Thus, the same step numbers used to designate steps in the routine shown in FIG. 5 will be applied to the corresponding step numbers used in the improved processing shown in FIG. 6, for the purpose of comparison of the two different routines. Steps S61-S64 will be hereinafter described in detail with reference to the accompanying drawings, while detailed description of steps S31, S33 through S41 will be omitted because the above description thereon seems to be self-explanatory.

At step S61, a check is made to determine, based on the driver's set-vehicle-speed SET switch operation information (an operational signal) from set-vehicle-speed SET switch 41 and the driver's recommended-vehicle-speed SET switch operation information (an operational signal) from recommended-vehicle-speed SET switch 42, whether either set-vehicle-speed SET switch 41 or recommended-vehicle-speed SET switch 42 is operated by the driver. Additionally, in the presence of the driver's set-vehicle-speed SET switch operation, a further check is made to determine whether the driver's set-vehicle-speed SET switch operation corresponds to (i) driver-operated host-vehicle-speed setting or (ii) driver-operated previous-set-vehicle-speed setting. When the driver's set-vehicle-speed SET switch operation corresponds to the driver-operated previous-set-vehicle-speed setting, the routine flows from step S61 to step S33. Conversely when the driver's set-vehicle-speed SET switch operation corresponds to the driver-operated host-vehicle-speed setting, the routine flows from step S61 to step S34. On the other hand, when recommended-vehicle-speed SET switch 42 is operated by the driver, the routine flows from step S61 to step S62. In contrast the above, in the absence of both the driver's set-vehicle-speed SET switch operation and the driver's recommended-vehicle-speed SET switch operation, one execution cycle of the cruise vehicle speed setting processing of FIG. 6 terminates.

At step S62, a limited vehicle speed, denoted by "$V_{LIMIT}$", (a limited vehicle speed of the driving lane (the traveling road) on which the host vehicle is currently traveling), detected by navigation device 20, is set to a set vehicle speed, denoted by "$V_{SET}$", for the ACC function at the current execution cycle. Thereafter, the routine advances to step S35, at which the ACC function becomes activated (ON). Thus, when the ACC function is deactivated (OFF) and the recommended-vehicle-speed SET switch operation is made by the driver via recommended-vehicle-speed SET switch 42, set vehicle speed $V_{SET}$ for the ACC function at the current execution cycle is set to limited vehicle speed $V_{LIMIT}$ of the host vehicle's driving lane, and then the ACC function becomes activated (ON) (see the flow from step S31 through steps S61-S62 to step S35).

In the improved procedure shown in FIG. 6, after step S41, step S63 occurs. At step S63, a check is made to determine, based on the driver's recommended-vehicle-speed SET switch operation information (an operational signal) from recommended-vehicle-speed SET switch 42, whether recommended-vehicle-speed SET switch 42 is operated by the driver. When recommended-vehicle-speed SET switch 42 is operated by the driver, the routine proceeds from step S63 to step S43. Conversely when recommended-vehicle-speed SET switch 42 is not operated by the driver, the routine proceeds from step S63 to step S64.

At step S64, a check is made to determine whether a specified condition, which enables or permits setting of set vehicle speed $V_{SET}$ for the ACC function to limited vehicle speed $V_{LIMIT}$ (the limited vehicle speed of the driving lane on which the host vehicle is currently traveling), detected by the system (in particular, navigation device 20), is satisfied or unsatisfied. When the specified condition is satisfied, the routine proceeds from step S64 to step S43. Conversely when the specified condition is unsatisfied, one execution cycle of the cruise vehicle speed setting processing of FIG. 6 terminates.

Next at step S43, set vehicle speed $V_{SET}$ for the ACC function is set to the detected limited vehicle speed $V_{LIMIT}$. In other words, when step S63 determines the presence of the driver's recommended-vehicle-speed SET switch operation, the limited vehicle speed $V_{LIMIT}$, detected by the system at the timing when recommended-vehicle-speed SET switch 42 has been operated by the driver, is set to the set vehicle speed $V_{SET}$ for the ACC function. In contrast, in the case that the specified condition, which enables setting of set vehicle speed $V_{SET}$ for the ACC function to limited vehicle speed $V_{LIMIT}$ (the limited vehicle speed of the driving lane on which the host vehicle is currently traveling), is satisfied without any driver's recommended-vehicle-speed SET switch operation (see the flow from step S63 to step S64), the limited vehicle speed $V_{LIMIT}$, detected by the system (in particular, navigation device 20) at the current cycle, is set to the set vehicle speed $V_{SET}$ for the ACC function (see the further flow from step S64 to step S43).

Figure 7:
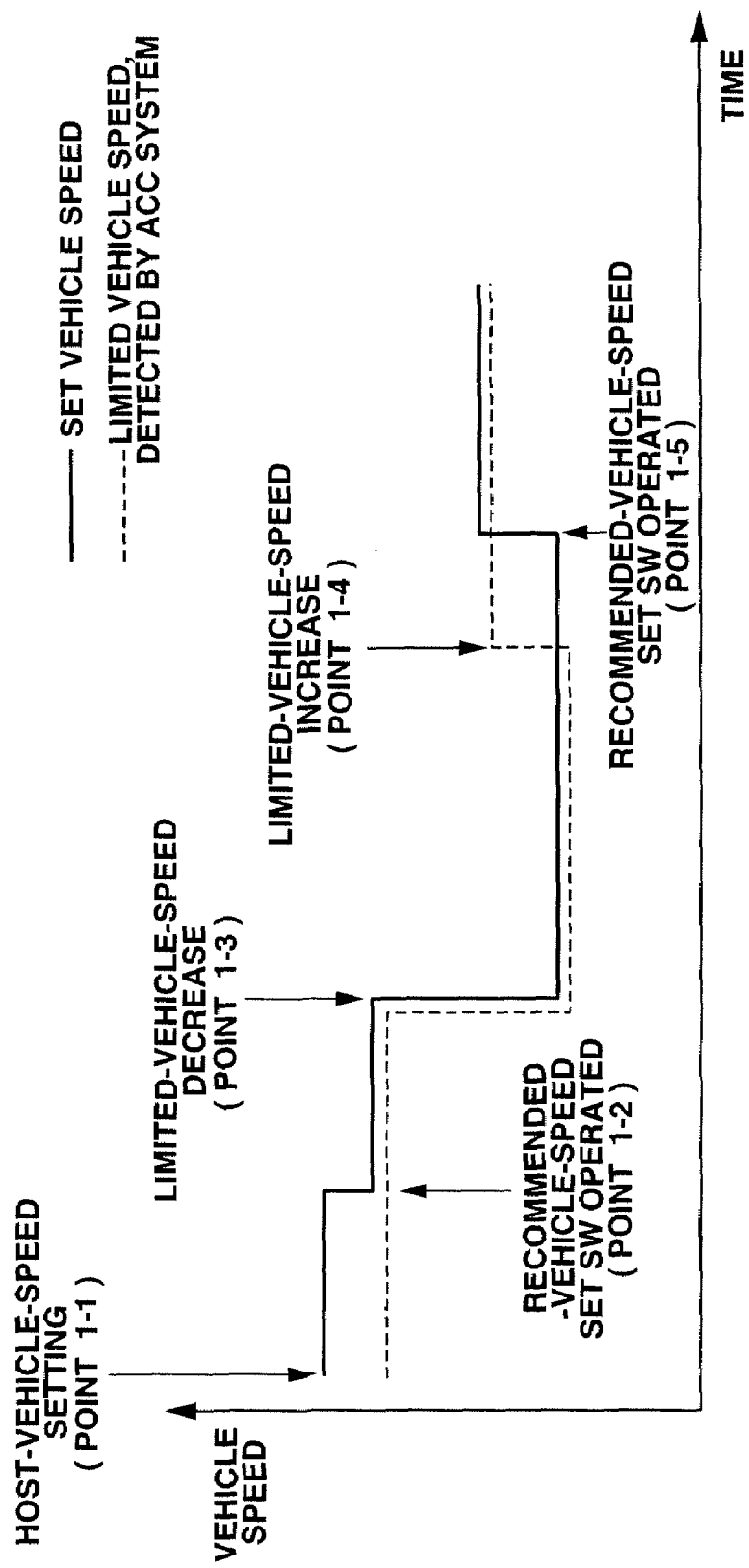
FIGS. 7-9 are time charts, illustrating first, second, and third examples concerning respective conditions for setting of set vehicle speed for the adaptive cruise traveling control function to limited vehicle speed.
Figure 8:
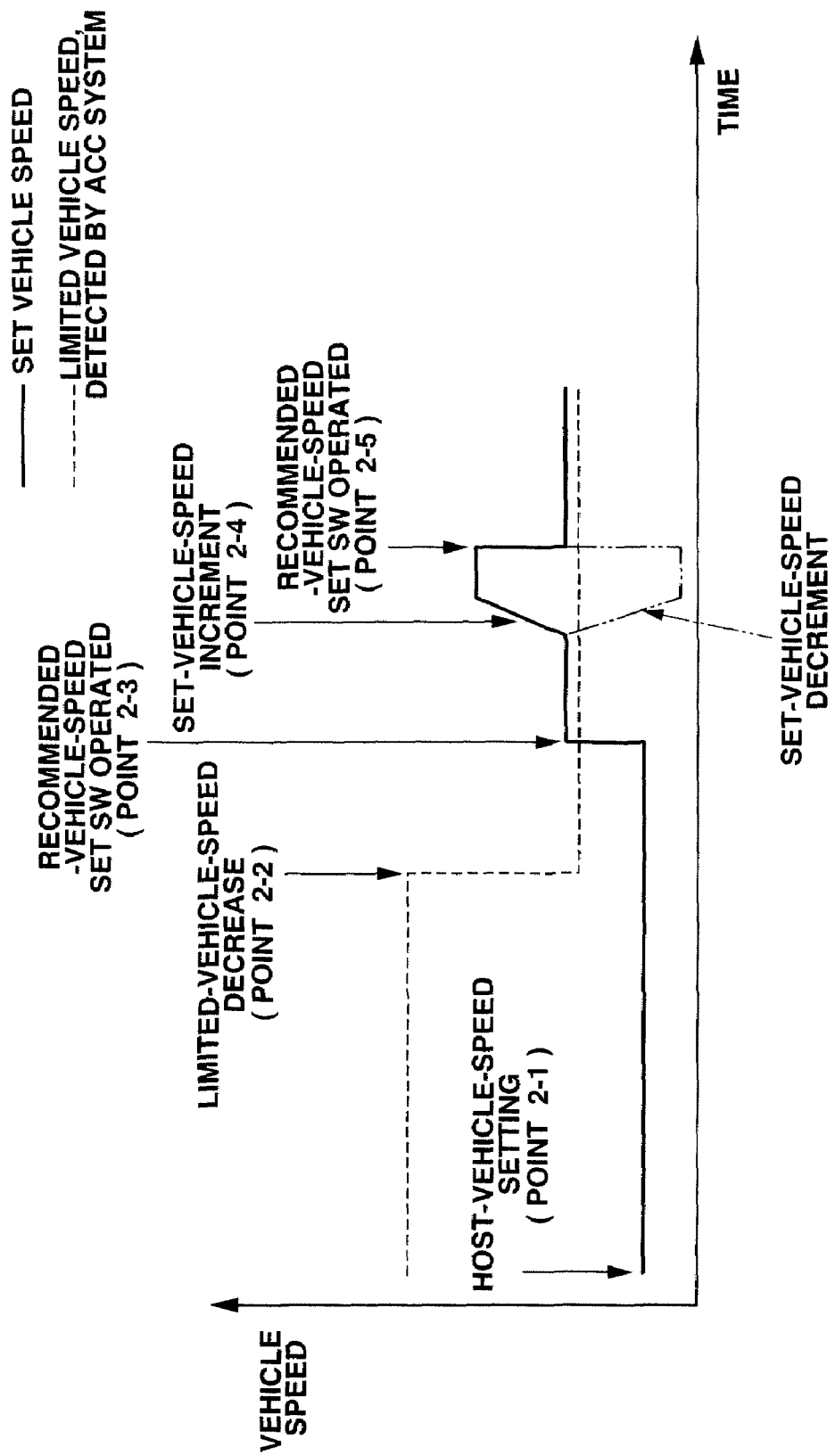
Figure 9:
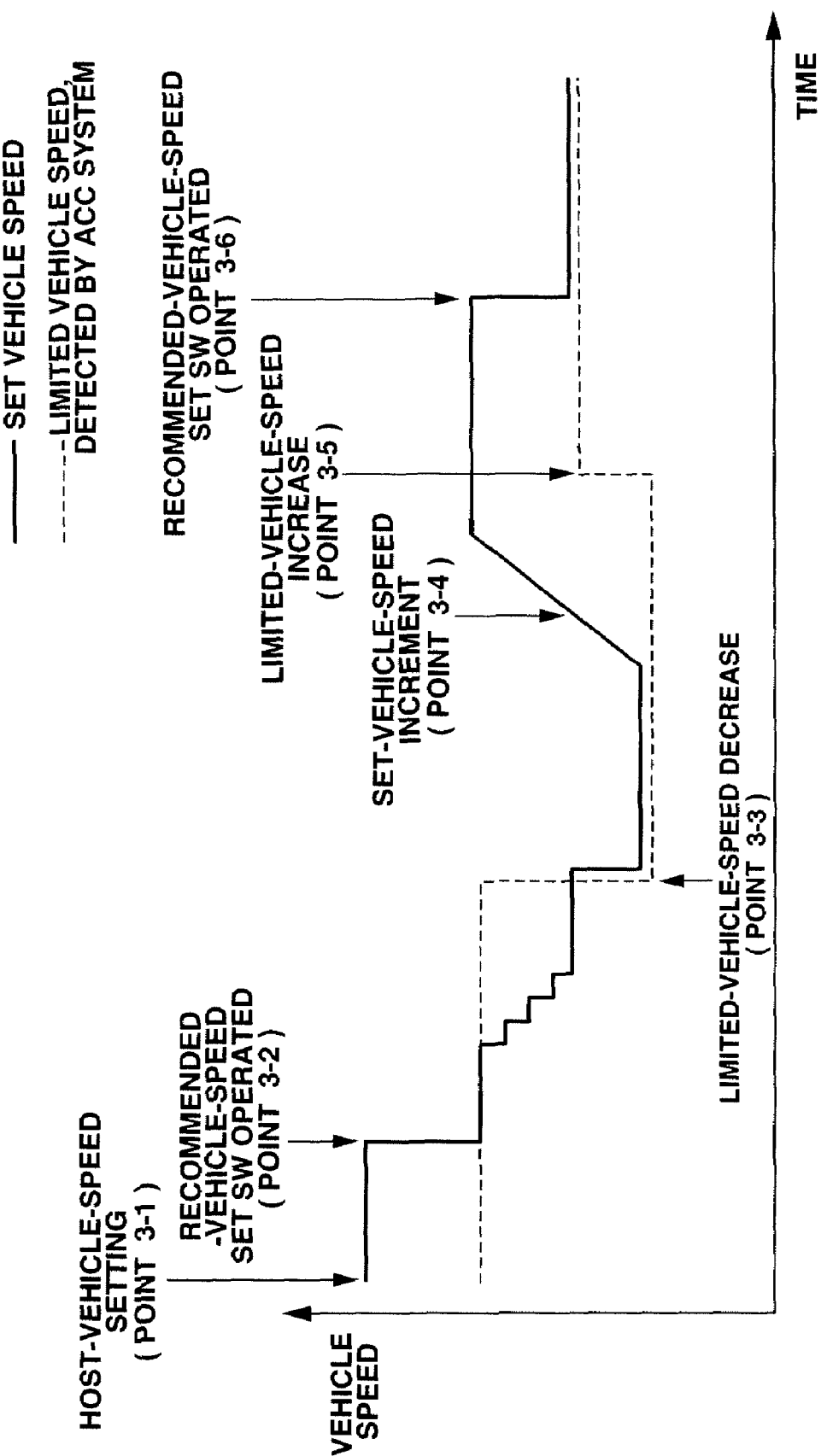

The details of the specified condition (the enabling condition utilized at step S64) that enables setting of set vehicle speed $V_{SET}$ for the ACC function to limited vehicle speed $V_{LIMIT}$, and the details of the disabling/canceling condition that disables (inhibits) or canceling setting of set vehicle speed $V_{SET}$ to limited vehicle speed $V_{LIMIT}$ are hereunder described in reference to the first through third examples indicated by the time charts of FIGS. 7-9.

(1) The first example concerning the specified condition (i.e., the enabling condition) that enables setting of set vehicle speed $V_{SET}$ for the ACC function to limited vehicle speed $V_{LIMIT}$, is defined by the following two items (i)-(ii):

(i) Recommended-vehicle-speed SET switch 42 is not operated by the driver at the current execution cycle, but the current set vehicle speed $V_{SET}$ for the ACC function has already been set to limited vehicle speed $V_{LIMIT}$ (the limited vehicle speed of the driving lane on which the host vehicle is currently traveling) by way of the previous recommended-vehicle-speed SET switch operation made by the driver at the previous execution cycle.

(ii) Thereafter, a limited-vehicle-speed change (a change in limited vehicle speed $V_{LIMIT}$ of the driving lane on which the host vehicle is currently traveling) is detected, and additionally the detected limited vehicle speed $V_{LIMIT(NEW)}$ becomes less than the limited vehicle speed $V_{LIMIT(OLD)}$ just before the detected limited-vehicle-speed change, that is, the detected limited-vehicle-speed change is a limited-vehicle-speed decrease.

(1-1) Point 1-1 of FIG. 7:

At the point of time 1-1, the adaptive cruise traveling control (ACC) system of the first embodiment detects or determines, based on the driver's set-vehicle-speed SET switch operation information, that set-vehicle-speed SET switch 41 is currently operated by the driver and the driver's set-vehicle-speed SET switch operation is the driver-operated host-vehicle-speed setting, under a condition where the ACC function is deactivated (OFF). Thus, at the point 1-1, set vehicle speed $V_{SET}$ for the ACC function is set to the host vehicle speed V and the ACC function becomes activated (ON) (see the flow defined by S31→S61→S34→S35 in FIG. 6).

At this time, assume that set vehicle speed $V_{SET}$, corresponding to the host vehicle speed at the point of time when the ACC function has been switched ON, becomes greater than limited vehicle speed $V_{LIMIT}$ detected by navigation device 20. According to the ACC system of the embodiment, set vehicle speed $V_{SET}$ becomes greater than limited vehicle speed $V_{LIMIT}$, but the set vehicle speed can be kept at the host vehicle speed determined based on the above-mentioned driver-operated host-vehicle-speed setting, until recommended-vehicle-speed SET switch 42 is operated by the driver. Therefore, when the driver wishes that the host vehicle should be traveled at the set vehicle speed, which speed value is greater than the limited vehicle speed, even in the ACC-function activated (ON) state, the ACC system of the embodiment enables the host vehicle to travel at the set vehicle speed under a condition where recommended-vehicle-speed SET switch 42 is not yet operated by the driver.

During the traveling control just after the point 1-1 at which the host-vehicle-speed setting has been made by the driver via set-vehicle-speed SET switch 41, the host vehicle must be controlled in a manner so as to be brought closer to the set vehicle speed. Actually, according to traveling control processing (host vehicle speed control processing) of the system of the embodiment, acceleration/deceleration control device 3 sets ACC desired vehicle speed $V_T$ to set vehicle speed $V_{SET}$ for the ACC function, which set vehicle speed is obtained through cruise vehicle speed setting section 40 (in particular, cruise vehicle speed setting processing section 43). Thereafter, the host vehicle speed is controlled in a manner so as to be brought closer to the ACC desired vehicle speed $V_T$.

Hitherto, for instance according to the ACC system of the comparative example as discussed previously in reference to the flowchart of FIG. 5, when limited vehicle speed $V_{LIMIT}$ of the driving lane, on which the host vehicle is currently traveling, is detected under a condition where the ACC function is activated (ON), the system sets or changes the set vehicle speed to the limited vehicle speed automatically (upon expiration of a predetermined time duration or a constant delay time) (see the flow from step S42 to step S43 in FIG. 5). That is, set vehicle speed $V_{SET}$ would be automatically set to limited vehicle speed $V_{LIMIT}$, regardless of a driver's wishes.

(1-2) Point 1-2 of FIG. 7:

At the point of time 1-2, the ACC system of the embodiment detects or determines, based on the driver's recommended-vehicle-speed SET switch operation information, that recommended-vehicle-speed SET switch 42 is currently operated by the driver, under a condition where the ACC function is activated (ON). Thus, at the point 1-2, set vehicle speed $V_{SET}$ for the ACC function is set to limited vehicle speed $V_{LIMIT}$ (see the flow from step S63 to step S43 in FIG. 6).

Therefore, the system of the embodiment enables the host vehicle to travel at limited vehicle speed $V_{LIMIT}$ by manually switching or changing set vehicle speed $V_{SET}$ to limited vehicle speed $V_{LIMIT}$ by using recommended-vehicle-speed SET switch 42 (serving as a man-machine interface). That is, basically on the assumption that recommended-vehicle-speed SET switch 42 is operated by the driver, setting (switching) of set vehicle speed $V_{SET}$ to limited vehicle speed $V_{LIMIT}$ is made. Thus, the timing of setting of set vehicle speed $V_{SET}$ to limited vehicle speed $V_{LIMIT}$ can be accurately matched or coincided with a driver's wishes.

During the traveling control just after the point 1-2 at which the recommended-vehicle-speed SET switch operation has been made by the driver via recommended-vehicle-speed SET switch 42, the host vehicle speed must be controlled in a manner so as to be brought closer to the set vehicle speed, which has been changed to the limited vehicle speed by manually operating recommended-vehicle-speed SET switch 42 by the driver. Actually, according to traveling control processing (host vehicle speed control processing) of the system of the embodiment, acceleration/deceleration control device 3 sets ACC desired vehicle speed $V_T$ to limited vehicle speed $V_{LIMIT}$ (identical to set vehicle speed $V_{SET}$ obtained through cruise vehicle speed setting section 40, at the point 1-2). Thereafter, the host vehicle speed is controlled in a manner so as to be brought closer to the ACC desired vehicle speed.

(1-3) Point 1-3 of FIG. 7:

At the point of time 1-3, the ACC system of the embodiment detects or determines that a limited-vehicle-speed change (a change in the limited vehicle speed of the driving lane on which the host vehicle is currently traveling) occurs under a condition where set vehicle speed $V_{SET}$ has been set or switched to limited vehicle speed $V_{LIMIT}$, and that the detected limited-vehicle-speed change is a limited-vehicle-speed decrease. Thus, at the point 1-3, set vehicle speed $V_{SET}$ for the ACC function is set or changed (decreased) according to the detected limited-vehicle-speed decrease (see the flow from step S64 to step S43 in FIG. 6). That is, the ACC system of the embodiment decreases set vehicle speed $V_{SET}$ according to the detected limited-vehicle-speed decrease.

Before the point 1-3 (that is, prior to the occurrence of the limited-vehicle-speed decrease), setting of set vehicle speed $V_{SET}$ to the previous limited vehicle speed $V_{LIMIT(OLD)}$ has already been completed by manually operating recommended-vehicle-speed SET switch 42 by the driver oneself. Therefore, there is a high possibility that the driver does not wish setting of set vehicle speed $V_{SET}$ to a speed value exceeding limited vehicle speed $V_{LIMIT}$. In other words, there is a high possibility that the driver does not wish that the host vehicle should be traveled at a speed exceeding limited vehicle speed $V_{LIMIT}$. Fully taking into account such a situation, the ACC system of the embodiment permits set vehicle speed $V_{SET}$ to automatically follow the limited-vehicle-speed decrease without driver intervention. Therefore, in setting of set vehicle speed $V_{SET}$ to limited vehicle speed $V_{LIMIT}$, it is possible to optimally reflect a driver's wishes timely (almost in real time), in such a situation, that is, under the specified condition of the first example (1), defined by the above two items (i)-(ii).

(1-4) Point 1-4 of FIG. 7:

At the point of time 1-4, the ACC system of the embodiment detects or determines that a limited-vehicle-speed change (a change in limited vehicle speed $V_{LIMIT}$ of the driving lane on which the host vehicle is currently traveling) occurs under a condition where set vehicle speed $V_{SET}$ has been set or switched to limited vehicle speed $V_{LIMIT}$, but the detected limited-vehicle-speed change is a limited-vehicle-speed increase. Thus, at the point 1-4, set vehicle speed $V_{SET}$ for the ACC function is retained unchanged (i.e., kept at the limited vehicle speed just before the limited-vehicle-speed increase) (see the termination of one cycle of the routine after the flow to step S64 in FIG. 6). That is, the ACC system of the embodiment retains set vehicle speed $V_{SET}$ unchanged, without permitting set vehicle speed $V_{SET}$ to follow limited vehicle speed $V_{LIMIT}$, in the presence of such a limited-vehicle-speed increase. In other words, the ACC system of the embodiment inhibits or disables setting of set vehicle speed $V_{SET}$ to limited vehicle speed $V_{LIMIT}$ in the case of such a limited-vehicle-speed increase.

In contrast to the point 1-3 at which set vehicle speed $V_{SET}$ automatically decreases due to a limited-vehicle-speed decrease, at the point 1-4 at which a limited-vehicle-speed increase occurs, suppose that set vehicle speed $V_{SET}$ will be automatically increased. In such a case, there is a high possibility that the host vehicle's accelerating action, created due to the automatically-increased set vehicle speed, causes the driver to feel considerable discomfort. For this reason, even when set vehicle speed $V_{SET}$ has already been set to limited vehicle speed $V_{LIMIT}$, prior to the occurrence of the limited-vehicle-speed change, the ACC system of the embodiment disables set vehicle speed $V_{SET}$ to follow limited vehicle speed $V_{LIMIT}$, under a specific condition where the limited-vehicle-speed change is a limited-vehicle-speed increase. This avoids or eliminates any unnatural feeling that the driver experiences uncomfortable accelerations of the host vehicle, occurring due to such a limited-vehicle-speed increase.

(1-5) Point 1-5 of FIG. 7:

At the point of time 1-5, the ACC system of the embodiment detects or determines, based on the driver's recommended-vehicle-speed SET switch operation information, that recommended-vehicle-speed SET switch 42 is currently operated by the driver, in the ACC-function activated (ON) state. Thus, at the point 1-5, set vehicle speed $V_{SET}$ for the ACC function is set to limited vehicle speed $V_{LIMIT}$ (see the flow from step S63 to step S43 in FIG. 6).

Therefore, the system of the embodiment enables the host vehicle to travel at limited vehicle speed $V_{LIMIT}$ by manually switching or changing set vehicle speed $V_{SET}$ to limited vehicle speed $V_{LIMIT}$ by using recommended-vehicle-speed SET switch 42 (serving as a man-machine interface). That is, even when a limited-vehicle-speed increase occurs, the ACC system of the embodiment grants priority to the driver's recommended-vehicle-speed SET switch operation. Thus, it is possible to optimally set or change set vehicle speed $V_{SET}$ to limited vehicle speed $V_{LIMIT}$ timely (in real time) in accord with a driver's wishes that the host vehicle should be traveled at limited vehicle speed $V_{LIMIT}$ after the occurrence of such a limited-vehicle-speed increase.

(2) The second example concerning the canceling condition that cancels setting of set vehicle speed $V_{SET}$ for the ACC function to limited vehicle speed $V_{LIMIT}$, is defined by the following two items (i)-(ii):

(i) Recommended-vehicle-speed SET switch 42 is not operated by the driver at the current execution cycle, but the current set vehicle speed $V_{SET}$ for the ACC function has already been set to limited vehicle speed $V_{LIMIT}$ (the limited vehicle speed of the driving lane on which the host vehicle is currently traveling) by way of the previous recommended-vehicle-speed SET switch operation made by the driver at the previous execution cycle.

(ii) Thereafter, a set-vehicle-speed increase is made by the driver via set-vehicle-speed SET switch 41 in the ACC-function activated (ON) state. In such a case, the ACC system of the embodiment cancels setting of set vehicle speed $V_{SET}$ to limited vehicle speed $V_{LIMIT}$.

(2-1) Point 2-1 of FIG. 7:

In a similar manner to the point 1-1 of FIG. 7, at the point of time 2-1 of FIG. 8, the ACC system of the embodiment detects or determines, based on the driver's set-vehicle-speed-SET-switch operation information, that set-vehicle-speed SET switch 41 is currently operated by the driver and the driver's set-vehicle-speed SET switch operation is the driver-operated host-vehicle-speed setting, under a condition where the ACC function is deactivated (OFF). Thus, at the point 2-1, set vehicle speed $V_{SET}$ for the ACC function is set to the host vehicle speed and the ACC function becomes activated (ON) (see the flow defined by S31→S61→S34→S35 in FIG. 6).

At this time, assume that set vehicle speed $V_{SET}$, corresponding to the host vehicle speed at the point of time when the ACC function has been switched ON, becomes less than limited vehicle speed $V_{LIMIT}$ detected by navigation device 20. According to the ACC system of the embodiment, set vehicle speed $V_{SET}$ becomes less than limited vehicle speed $V_{LIMIT}$, but the set vehicle speed can be kept at the host vehicle speed determined based on the above-mentioned driver-operated host-vehicle-speed setting, until recommended-vehicle-speed SET switch 42 is operated by the driver. Therefore, when the driver wishes that the host vehicle should be traveled at the set vehicle speed, which speed value is less than the limited vehicle speed, even in the ACC-function activated (ON) state, the ACC system of the embodiment enables the host vehicle to travel at the set vehicle speed under a condition where recommended-vehicle-speed SET switch 42 is not yet operated by the driver.

(2-2) Point 2-2 of FIG. 8:

At the point of time 2-2, the ACC system of the embodiment detects or determines that a limited-vehicle-speed decrease (a decrease in limited vehicle speed $V_{LIMIT}$ of the driving lane on which the host vehicle is currently traveling) occurs, but recommended-vehicle-speed SET switch 42 is not yet operated by the driver. Thus, the set vehicle speed is retained unchanged (i.e., kept at the host vehicle speed at the point of time when the ACC function has been switched ON) (see the termination of one cycle of the routine after the flow from step S63 to step S64 in FIG. 6).

At the point 2-2, the driver does not yet operate recommended-vehicle-speed SET switch 42, and therefore it is undesirable to set the set vehicle speed to the limited vehicle speed due to the limited-vehicle-speed decrease. Thus, wasteful setting of set vehicle speed $V_{SET}$ to limited vehicle speed $V_{LIMIT}$ can be effectively inhibited or avoided by retaining the set vehicle speed unchanged. This process matches a driver's wishes.

(2-3) Point 2-3 of FIG. 8:

At the point of time 2-3, the ACC system of the embodiment detects or determines, based on the driver's recommended-vehicle-speed SET switch operation information, that recommended-vehicle-speed SET switch 42 is currently operated by the driver, in the ACC-function activated (ON) state. Thus, at the point 2-3, set vehicle speed $V_{SET}$ for the ACC function is set to limited vehicle speed $V_{LIMIT}$ (see the flow from step S63 to step S43 in FIG. 6).

Therefore, the system of the embodiment enables the host vehicle to travel at limited vehicle speed $V_{LIMIT}$ by manually switching or changing set vehicle speed $V_{SET}$ to limited vehicle speed $V_{LIMIT}$ by using recommended-vehicle-speed SET switch 42 (serving as a man-machine interface). That is, even when limited vehicle speed $V_{LIMIT}$ is greater than set vehicle speed $V_{SET}$, the ACC system of the embodiment grants priority to the driver's recommended-vehicle-speed SET switch operation. Thus, it is possible to optimally set or change set vehicle speed $V_{SET}$ to limited vehicle speed $V_{LIMIT}$ timely (in real time) in accord with a driver's wishes that the host vehicle should be traveled at limited vehicle speed $V_{LIMIT}$.

(2-4) Point 2-4 of FIG. 8:

At the point of time 2-4, the ACC system of the embodiment detects or determines, based on the driver's set-vehicle-speed SET switch operation information, that set-vehicle-speed SET switch 41 is currently operated by the driver and the driver's set-vehicle-speed SET switch operation is the driver-operated host vehicle speed increasing, under a condition where set vehicle speed $V_{SET}$ has already been set to limited vehicle speed $V_{LIMIT}$. Thus, set vehicle speed $V_{SET}$ is increased from the current speed value up to a higher speed value based on the driver-operated set-vehicle-speed increasing (see the termination of one cycle of the routine after the flow to step S64 in FIG. 6).

Therefore, it is possible to set or increase set vehicle speed $V_{SET}$ to a speed value, which is higher than limited vehicle speed $V_{LIMIT}$, by way of only the driver-operated set-vehicle-speed increasing, even when set vehicle speed $V_{SET}$ has already been set to limited vehicle speed $V_{LIMIT}$.

(2-5) Point 2-5 of FIG. 8:

At the point of time 2-5, the ACC system of the embodiment detects or determines, based on the driver's recommended-vehicle-speed SET switch operation information, that recommended-vehicle-speed SET switch 42 is currently operated by the driver, in the ACC-function activated (ON) state. Thus, at the point 2-5, set vehicle speed $V_{SET}$ for the ACC function is set to limited vehicle speed $V_{LIMIT}$ (see the flow from step S63 to step S43 in FIG. 6).

Therefore, the system of the embodiment enables the host vehicle to travel at limited vehicle speed $V_{LIMIT}$ by manually switching or changing set vehicle speed $V_{SET}$ to limited vehicle speed $V_{LIMIT}$ by using recommended-vehicle-speed SET switch 42 (serving as a man-machine interface). That is, even when set vehicle speed $V_{SET}$ has been increased up to a speed value, which is higher than limited vehicle speed $V_{LIMIT}$, by the driver-operated set-vehicle-speed increasing, the ACC system of the embodiment grants priority to the driver's recommended-vehicle-speed SET switch operation. Thus, it is possible to optimally set or change set vehicle speed $V_{SET}$ to limited vehicle speed $V_{LIMIT}$ timely (in real time) in accord with a driver's wishes that the host vehicle should be traveled at limited vehicle speed $V_{LIMIT}$.

For instance, suppose that set vehicle speed $V_{SET}$ must be temporarily increased in order for the host vehicle to pass the preceding vehicle. After set vehicle speed $V_{SET}$ has been temporarily increased to produce passing acceleration and then the host vehicle has passed the preceding vehicle, the ACC system of the embodiment can simply reset set vehicle speed $V_{SET}$ to limited vehicle speed $V_{LIMIT}$ (that is, decelerate the host vehicle) by way of only the driver's recommended-vehicle-speed SET switch operation.

In the second example (2) shown in FIG. 8, the driver-operated set-vehicle-speed increasing is exemplified as the canceling condition that cancels setting of set vehicle speed $V_{SET}$ for the ACC function to limited vehicle speed $V_{LIMIT}$. It will be appreciated that the invention is not limited to the particular embodiments shown and described herein, but the driver-operated set-vehicle-speed decreasing may be used as the canceling condition. In such a case, as clearly indicated by the phantom line (the two-dotted line) in FIG. 8, at the point of time 2-4, the ACC system of the embodiment detects or determines, based on the driver's set-vehicle-speed SET switch operation information, that set-vehicle-speed SET switch 41 is currently operated by the driver and the driver's set-vehicle-speed SET switch operation is the driver-operated host vehicle speed decreasing, under a condition where set vehicle speed $V_{SET}$ has already been set to limited vehicle speed $V_{LIMIT}$. Thus, set vehicle speed $V_{SET}$ is decreased from the current speed value down to a lower speed value based on the driver-operated set-vehicle-speed decreasing (see the termination of one cycle of the routine after the flow to step S64 in FIG. 6). Therefore, it is possible to set or decrease set vehicle speed $V_{SET}$ to a speed value, which is lower than limited vehicle speed $V_{LIMIT}$, by way of only the driver-operated set-vehicle-speed decreasing, even when set vehicle speed $V_{SET}$ has already been set to limited vehicle speed $V_{LIMIT}$. Thereafter, at the point of time 2-5, the ACC system of the embodiment detects or determines, based on the driver's recommended-vehicle-speed SET switch operation information, that recommended-vehicle-speed SET switch 42 is currently operated by the driver, in the ACC-function activated (ON) state. Thus, at the point 2-5, set vehicle speed $V_{SET}$ for the ACC function is set to limited vehicle speed $V_{LIMIT}$ (see the flow from step S63 to step S43 in FIG. 6). Therefore, the system of the embodiment enables the host vehicle to travel at limited vehicle speed $V_{LIMIT}$ by manually switching or changing set vehicle speed $V_{SET}$ to limited vehicle speed $V_{LIMIT}$ by using recommended-vehicle-speed SET switch 42. That is, even when set vehicle speed $V_{SET}$ has been decreased down to a speed value, which is lower than limited vehicle speed $V_{LIMIT}$, by the driver-operated set-vehicle-speed decreasing, the ACC system of the embodiment grants priority to the driver's recommended-vehicle-speed SET switch operation. Thus, it is possible to optimally set or change set vehicle speed $V_{SET}$ to limited vehicle speed $V_{LIMIT}$ timely (in real time) in accord with a driver's wishes that the host vehicle should be traveled at limited vehicle speed $V_{LIMIT}$.

(3) The third example concerning the specified condition (i.e., the enabling condition) that enables setting of set vehicle speed $V_{SET}$ for the ACC function to limited vehicle speed $V_{LIMIT}$, is defined by the following two items (i)-(ii):
 (i) Recommended-vehicle-speed SET switch 42 is not operated by the driver at the current execution cycle and thus setting of set vehicle speed $V_{SET}$ to limited vehicle speed $V_{LIMIT}$ is not made, but a limited-vehicle-speed change (a change in limited vehicle speed $V_{LIMIT}$ of the driving lane on which the host vehicle is currently traveling) is detected and additionally the detected limited vehicle speed $V_{LIMIT(NEW)}$ becomes less than the limited vehicle speed $V_{LIMIT(OLD)}$ just before the detected limited-vehicle-speed change, that is, the detected limited-vehicle-speed change is a limited-vehicle-speed decrease.
 (ii) Additionally, it has been determined that the driver's intention for setting of set vehicle speed $V_{SET}$ to limited vehicle speed $V_{LIMIT}$ is strong.

(3-1) Point 3-1 of FIG. 9:
In a similar manner to the point 1-1 of FIG. 7, at the point of time 3-1 of FIG. 9, the ACC system of the embodiment detects or determines, based on the driver's set-vehicle-speed SET switch operation information, that set-vehicle-speed SET switch 41 is currently operated by the driver and the driver's set-vehicle-speed SET switch operation is the driver-operated host-vehicle-speed setting, under a condition where the ACC function is deactivated (OFF). Thus, at the point 3-1, set vehicle speed $V_{SET}$ for the ACC function is set to the host vehicle speed and the ACC function becomes activated (ON) (see the flow defined by S31→S61→S34→S35 in FIG. 6).

(3-2) Point 3-2 of FIG. 9:
In a similar manner to the point 1-2 of FIG. 7, at the point of time 3-2 of FIG. 9, the ACC system of the embodiment detects or determines, based on the driver's recommended-vehicle-speed SET switch operation information, that recommended-vehicle-speed SET switch 42 is currently operated by the driver, under a condition where the ACC function is activated (ON). Thus, at the point 3-2, set vehicle speed $V_{SET}$ for the ACC function is set to limited vehicle speed $V_{LIMIT}$ (see the flow from step S63 to step S43 in FIG. 6).

(3-3) Point 3-3 of FIG. 9:
At the point of time 3-3 of FIG. 9, the ACC system of the embodiment detects or determines that recommended-vehicle-speed SET switch 42 is not operated by the driver at the current execution cycle and thus setting of set vehicle speed $V_{SET}$ to limited vehicle speed $V_{LIMIT}$ is not made, but a limited-vehicle-speed decrease (a decrease in limited vehicle speed $V_{LIMIT}$ of the driving lane on which the host vehicle is currently traveling) occurs. Additionally, when the ACC system determines that there is a strong driver's intention for setting of set vehicle speed $V_{SET}$ to limited vehicle speed $V_{LIMIT}$, at the point 3-3, the ACC system automatically sets the set vehicle speed $V_{SET}$ to limited vehicle speed $V_{LIMIT}$ (see the flow from step S64 to step S43 in FIG. 6).

For instance, suppose that an alteration in set vehicle speed $V_{SET}$ to a speed value, which is lower than limited vehicle speed $V_{LIMIT}$, has been made by the driver via set-vehicle-speed SET switch 41, after the temporary driver's setting of set vehicle speed $V_{SET}$ to limited vehicle speed $V_{LIMIT}$ via recommended-vehicle-speed SET switch 42, just before the point 3-3 of FIG. 9. In such a case, the ACC system of the embodiment determines that there is a strong driver's intention for setting from set vehicle speed $V_{SET}$ to limited vehicle speed $V_{LIMIT}$. This (see the temporary driver's setting of set vehicle speed $V_{SET}$ to limited vehicle speed $V_{LIMIT}$ and the manually-operated, step-down operation of set vehicle speed $V_{SET}$ between the points 3-2 and 3-3 in FIG. 9) is one criterion for determining whether or not there is a strong driver's intention for setting of set vehicle speed $V_{SET}$ to limited vehicle speed $V_{LIMIT}$.

In the presence of such a strong driver's intention for setting of set vehicle speed $V_{SET}$ to limited vehicle speed $V_{LIMIT}$ (for example, in the presence of the driver's alteration of set vehicle speed $V_{SET}$ to a speed value lower than limited vehicle speed $V_{LIMIT}$ subsequently to the temporary driver's setting of set vehicle speed $V_{SET}$ to limited vehicle speed $V_{LIMIT}$ via recommended-vehicle-speed SET switch 42), there is a high possibility that the driver does not wish that the host vehicle should be traveled at a speed exceeding limited vehicle speed $V_{LIMIT}$. Fully taking into account such a situation, the ACC system of the embodiment permits set vehicle speed $V_{SET}$ to be automatically set to limited vehicle speed $V_{LIMIT}$ without driver intervention, when a limited-vehicle-speed decrease occurs under a specific condition where there is a strong driver's intention for setting of set vehicle speed $V_{SET}$ to limited vehicle speed $V_{LIMIT}$ and additionally the detected limited vehicle speed becomes less than the current set vehicle speed. Therefore, in setting of set vehicle speed $V_{SET}$ to limited vehicle speed $V_{LIMIT}$, it is possible to optimally reflect a driver's wishes timely (in real time), in such a situation, that is, under the specified condition of the third example (3), defined by the above two items (i)-(ii). That is, the ACC system of the embodiment enables the host vehicle to travel at a speed whose value does not exceed the detected limited vehicle speed, in accord with a driver's wishes.

(3-4) Point 3-4 of FIG. 9:

At the point of time 3-4, the ACC system of the embodiment detects or determines, based on the driver's set-vehicle-speed SET switch operation information, that set-vehicle-speed SET switch 41 is currently operated by the driver and the driver's set-vehicle-speed SET switch operation is the driver-operated host vehicle speed increasing, under a condition where set vehicle speed $V_{SET}$ has already been set to limited vehicle speed $V_{LIMIT}$. Thus, set vehicle speed $V_{SET}$ is increased from the current speed value up to a higher speed value based on the driver-operated set-vehicle-speed increasing (see the termination of one cycle of the routine after the flow to step S64 in FIG. 6).

(3-5) Point 3-5 of FIG. 9:

At the point of time 3-5, the ACC system of the embodiment detects or determines that a limited-vehicle-speed increase (an increase in limited vehicle speed $V_{LIMIT}$ of the driving lane on which the host vehicle is currently traveling) occurs, but recommended-vehicle-speed SET switch 42 is not yet operated by the driver. Thus, set vehicle speed $V_{SET}$ is retained unchanged (see the termination of one cycle of the routine after the flow from step S63 to step S64 in FIG. 6).

At the point 3-5, the driver does not yet operate recommended-vehicle-speed SET switch 42, and therefore it is undesirable to set the set vehicle speed $V_{SET}$ to limited vehicle speed $V_{LIMIT}$ due to the limited-vehicle-speed decrease. Thus, wasteful setting of set vehicle speed $V_{SET}$ to limited vehicle speed $V_{LIMIT}$ can be effectively inhibited or avoided by retaining set vehicle speed $V_{SET}$ unchanged. This process matches a driver's wishes.

(3-6) Point 3-6 of FIG. 9:

At the point of time 3-6, the ACC system of the embodiment detects or determines, based on the driver's recommended-vehicle-speed SET switch operation information, that recommended-vehicle-speed SET switch 42 is currently operated by the driver, in the ACC-function activated (ON) state. Thus, at the point 3-6, set vehicle speed $V_{SET}$ for the ACC function is set to limited vehicle speed $V_{LIMIT}$, detected by navigation device 20 of the ACC system of the embodiment (see the flow from step S63 to step S43 in FIG. 6).

In the ACC system of the first embodiment, described previously in reference to FIGS. 1-4, 6, and 7-9, the process of step S61 of cruise vehicle speed setting section 40 (in particular, obtaining or acquiring the driver's set-vehicle-speed SET switch operation information) serves as set vehicle speed detection means (a set vehicle speed detector) for detecting set vehicle speed $V_{SET}$, which is set depending on at least a driver's operation made to a man-machine interface (i.e., set-vehicle-speed SET switch 41). The process of step S41 of cruise vehicle speed setting section 40 serves as limited vehicle speed detection means (a limited vehicle speed detector) for detecting limited vehicle speed $V_{LIMIT}$ of a driving lane (a road), on which the host vehicle is traveling. Recommended-vehicle-speed SET switch 42, constructing part of cruise vehicle speed setting section 40, serves as operating means (a man-machine interface) configured to manually set ACC desired vehicle speed $V_T$ to limited vehicle speed $V_{LIMIT}$ by a driver's operation made to a man-machine interface (i.e., recommended-vehicle-speed SET switch 42). On the other hand, acceleration/deceleration control device 3 serves as control means (a control device) for controlling host vehicle speed V in a manner so as to bring host vehicle speed V closer to desired vehicle speed $V_T$. The process of step S63 of cruise vehicle speed setting section 40 serves as driver's operation detection means (a driver's operation detector) for detecting the driver's operation made to the operating means (i.e., recommended-vehicle-speed SET switch 42). The processes of steps S33, S34, S41, S43, and S63-S64 of cruise vehicle speed setting section 40 serve as desired vehicle speed setting means (a desired vehicle speed setting circuit) configured to set, at a basic speed-control mode (a first ACC-vehicle-speed setting mode mainly related to steps S33-S34), ACC desired vehicle speed $V_T$ to set vehicle speed $V_{SET}$ detected by the set vehicle speed detection means, and also configured to set, at a driver-intervention speed-control mode (a second ACC-vehicle-speed setting mode mainly related to steps S41, S43 and S63-S64), ACC desired vehicle speed $V_T$ to limited vehicle speed $V_{LIMIT}$ detected by the limited vehicle speed detection means, based on a result of detection of the driver's operation made to the operating means (i.e., recommended-vehicle-speed SET switch 42), under a condition where limited vehicle speed $V_{LIMIT}$ has been detected by the limited vehicle speed detection means.

(Operations and Effects)

(1) According to the ACC system of the first embodiment, basically, at a first ACC-vehicle-speed setting mode, ACC desired vehicle speed $V_T$ is set to set vehicle speed $V_{SET}$. At a second ACC-vehicle-speed setting mode, when recommended-vehicle-speed SET switch 42 is operated by the driver under a condition where limited vehicle speed $V_{LIMIT}$ of the host vehicle's driving lane has been detected, ACC desired vehicle speed $V_T$ is set to limited vehicle speed $V_{LIMIT}$, while altering ACC desired vehicle speed $V_T$ from set vehicle speed $V_{SET}$. Thus, it is possible to optimally set or change ACC desired vehicle speed $V_T$ to limited vehicle speed $V_{LIMIT}$ timely (in real time) in accord with a driver's wishes, thereby enabling the host vehicle to travel at limited vehicle speed $V_{LIMIT}$. According to the ACC system of the embodiment, even after ACC desired vehicle speed $V_T$ has been altered from limited vehicle speed $V_{LIMIT}$ with driver intervention due to the driver-operated set-vehicle-speed change (the driver-operated set-vehicle-speed increasing/decreasing) as well as due to either the driver-operated host-vehicle-speed setting or the driver-operated previous-set-vehicle-speed setting, it is possible to easily reset ACC desired vehicle speed $V_T$ to limited vehicle speed $V_{LIMIT}$ only by manually operating recommended-vehicle-speed SET switch 42 by the driver.

(2) The ACC system of the embodiment sets ACC desired vehicle speed $V_T$ to limited vehicle speed $V_{LIMIT}$ at the timing of detection of the driver's recommended-vehicle-speed SET switch operation. Thus, setting of ACC desired vehicle speed $V_T$ to limited vehicle speed $V_{LIMIT}$ is well-timed in accord with a driver's wishes, without any wasteful waiting time (see the constant delay time Tover, such as 10 seconds, measured through step S42 in FIG. 5). That is, the system of the embodiment can realize the well-timed starting point of host vehicle's traveling at limited vehicle speed $V_{LIMIT}$, by only the driver's recommended-vehicle-speed SET switch operation.

(3) According to the ACC system of the embodiment, when a limited-vehicle-speed decrease occurs under a condition where ACC desired vehicle speed $V_T$ (set vehicle speed $V_{SET}$) has been set or switched to limited vehicle speed $V_{LIMIT}$, the system automatically sets ACC desired vehicle speed $V_T$, in such a manner as to permit ACC desired vehicle speed $V_T$ to automatically follow the limited-vehicle-speed decrease without driver intervention. Thus, the system of the embodiment permits the automatic follow-up action of ACC desired vehicle speed $V_T$ closer to the decreased limited vehicle speed $V_{LIMIT}$ without any driver intervention. Additionally, the system of the embodiment permits the automatic follow-up action of ACC desired vehicle speed $V_T$ closer to the altered limited vehicle speed $V_{LIMIT}$ without any driver intervention only in the case of the occurrence of a limited-vehicle-speed decrease, but inhibits the automatic follow-up action of ACC desired vehicle speed $V_T$ closer to the altered limited vehicle speed $V_{LIMIT}$ in the case of the occurrence of a limited-vehicle-speed increase, for the reasons set out above. That is, suppose that ACC desired vehicle speed $V_T$ will be automatically increased in such a manner as to follow the increased limited vehicle speed due to such a limited-vehicle-speed increase. In such a case, there is a high possibility that the host vehicle's accelerating action, created due to the automatically-increased ACC desired vehicle speed, causes the driver to feel considerable discomfort. Thus, the system of the embodiment disables ACC desired vehicle speed $V_T$ to follow limited vehicle speed $V_{LIMIT}$, under a specific condition where the limited-vehicle-speed change is a limited-vehicle-speed increase. This prevents or eliminates any unnatural feeling that the driver experiences uncomfortable accelerations of the host vehicle, occurring due to such a limited-vehicle-speed increase.

(4) Under a condition where an alteration in set vehicle speed $V_{SET}$ to a speed value, which is lower than limited vehicle speed $V_{LIMIT}$, has made by the driver via set-vehicle-speed SET switch 41 subsequently to temporary driver's setting of set vehicle speed $V_{SET}$ to limited vehicle speed $V_{LIMIT}$ via recommended-vehicle-speed SET switch 42, when limited vehicle speed $V_{LIMIT}$ becomes less than set vehicle speed $V_{SET}$, the ACC system of the embodiment sets ACC desired vehicle speed $V_T$ to limited vehicle speed $V_{LIMIT}$. That is, the system of the embodiment determines that the previously-operated, temporary driver's setting of set vehicle speed $V_{SET}$ to limited vehicle speed $V_{LIMIT}$ via recommended-vehicle-speed SET switch 42 indicates a strong driver's intention for host vehicle's traveling at limited vehicle speed $V_{LIMIT}$. Therefore, in the case that the system determines the presence of the strong driver's intention for host vehicle's traveling at limited vehicle speed $V_{LIMIT}$, even when the driver's operation for recommended-vehicle-speed SET switch 42 is not detected presently, the system automatically sets ACC desired vehicle speed $V_T$ to limited vehicle speed $V_{LIMIT(NEW)}$ at a point of time (see the point 3-3 in FIG. 9) when limited vehicle speed $V_{LIMIT(NEW)}$ becomes less than the current set vehicle speed due to a limited-vehicle-speed decrease. That is, the system enables automatic setting of ACC desired vehicle speed $V_T$ to limited vehicle speed $V_{LIMIT}$ without driver intervention (i.e., without driver's recommended-vehicle-speed SET switch operation), under a specific condition where there is a strong driver's intention for host vehicle's traveling at limited vehicle speed $V_{LIMIT}$ and additionally the detected limited vehicle speed becomes less than the current set vehicle speed. Additionally, by using a necessary condition that limited vehicle speed $V_{LIMIT}$ becomes less than the current set vehicle speed, the system enables the host vehicle to travel at a speed whose value does not exceed limited vehicle speed $V_{LIMIT}$.

Second Embodiment

Figure 10:
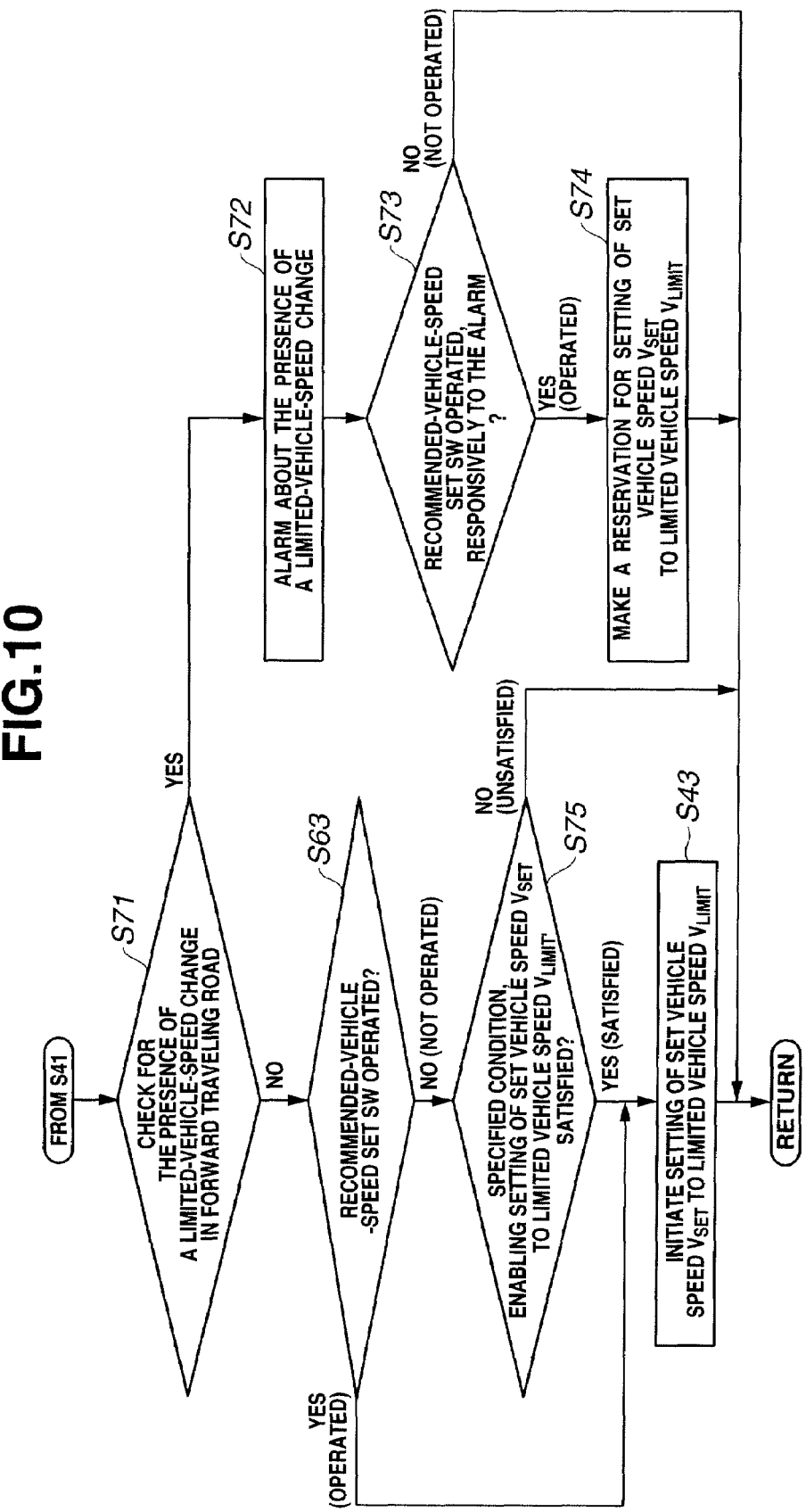
FIG. 10 is a flowchart illustrating a modified procedure executed within a cruise vehicle speed setting section of the ACC system of the second embodiment.

Basically, the system configuration of the ACC system of the second embodiment is similar to that of the first embodiment, but the procedure executed within cruise vehicle speed setting section 40 of the ACC system of the second embodiment is somewhat different from that of the first embodiment, as hereunder described in detail in reference to the flowchart of FIG. 10.

Referring now to FIG. 10, there is shown the somewhat modified processing executed within the cruise vehicle speed setting section of the ACC system of the second embodiment. The modified processing shown in FIG. 10 is executed as time-triggered interrupt routines to be triggered every predetermined sampling time intervals. As appreciated from comparison between the processing of the ACC system of the first embodiment shown in FIG. 6 and the modified processing of the ACC system of the second embodiment shown in FIG. 10, the modified processing of FIG. 10 is similar to the processing of FIG. 6, except that, in the processing of FIG. 10 a series of steps S71-S74 are newly added, and step S64 included in the processing of FIG. 6 is replaced with step S75, which step S75 is included in the processing of FIG. 10 and modified from step S64 of FIG. 6. Thus, the same step numbers used to designate steps in the processing shown in FIG. 6 will be applied to the corresponding step numbers used in the modified processing shown in FIG. 10, for the purpose of comparison of the two different interrupt routines. Steps S71-S75 will be hereinafter described in detail with reference to the accompanying drawings, while detailed description of steps S31, S33-S41, S43, and S61-S63 will be omitted because the above description thereon seems to be self-explanatory.

At step S71 of FIG. 10, occurring subsequently to step S41, a check is made to determine, based on the forward road information detected by navigation device 20 (in particular, preview data origination section 23), the presence of a limited-vehicle-speed change occurring in a predetermined range from the currently-specified host vehicle's position to a constant distance L, such as 500 meters, ahead of the currently-specified host vehicle's position. The host vehicle's travel road in the aforementioned predetermined range will be hereinafter referred to as "forward traveling road". Additionally, at step S71, a further check is made to determine whether the changed limited vehicle speed becomes greater than the current set vehicle speed (the limited vehicle speed of the driving lane (the traveling road) on which the host vehicle is currently traveling). When the answer to step S71 is in the affirmative (YES), that is, when there is a limited-vehicle-speed change in the forward traveling road and additionally the changed limited vehicle speed becomes greater than the current set vehicle speed, the routine proceeds from step S71 to step S72. Conversely when the answer to step S71 is in the negative (NO), the routine proceeds from step S71 to step S63.

As discussed above, basically, the routine advances from step S71 to step S72, under a condition where the changed limited vehicle speed becomes greater than the current set vehicle speed. However, even when the changed limited vehicle speed becomes greater than the current set vehicle speed, if a reservation for setting of set vehicle speed $V_{SET}$ to limited vehicle speed $V_{LIMIT}$ has been made through step S74 (described later), in other words, if a driver's operation of recommended-vehicle-speed SET switch 42 has been detected through step S73 (described later), then the routine proceeds from step S71 to step S63. Furthermore, even when the changed limited vehicle speed becomes greater than the current set vehicle speed and a reservation for setting of set vehicle speed $V_{SET}$ to limited vehicle speed $V_{LIMIT}$ cannot be made through step S74 (in other words, a driver's operation of recommended-vehicle-speed SET switch 42 cannot be detected through step S73), if an alarm about the presence of the limited-vehicle-speed change in the forward traveling road is repeated for a predetermined time period (a predetermined elapsed time, measured from the starting point of the alarm) through step S72 (described hereunder), then the routine proceeds from step S71 to step S63.

At step S72, an alarming device (alarming means) alarms the driver about the presence of the limited-vehicle-speed change in the forward traveling road in advance.

Figure 11:
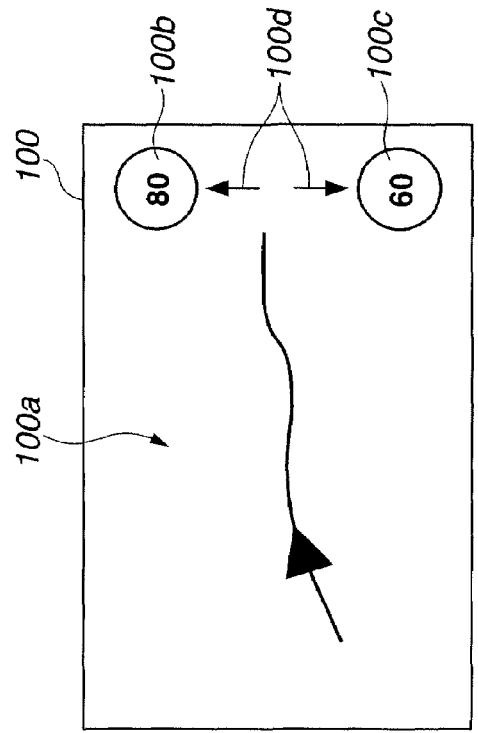
FIG. 11 is a schematic drawing illustrating a form of informing or alarming the driver about a limited vehicle speed change occurring in a road in front of the host vehicle.

Referring now to FIG. 11, there is shown a form of informing or alarming the driver about the presence of the limited-vehicle-speed change in the forward traveling road. As shown in FIG. 11, navigation information (map information) 100a and forward-traveling-road limited-vehicle-speed information 100b are displayed in an on-vehicle monitor 100.

At step S73 after the limited-vehicle-speed change has been alarmed through step S72, a check is made to determine, based on the driver's recommended-vehicle-speed SET switch operation information (an operational signal) from recommended-vehicle-speed SET switch 42, whether the driver has operated, responsively to the alarm, recommended-vehicle-speed SET switch 42. When the answer to step S73 is affirmative (YES), that is, when recommended-vehicle-speed SET switch 42 has been operated by the driver responsively to the alarm, the routine proceeds to step S74. Conversely when the answer to step S73 is negative (NO), that is, when recommended-vehicle-speed SET switch 42 has not yet been operated by the driver responsively to the alarm, one execution cycle of the cruise vehicle speed setting processing of FIG. 10 terminates. For instance, when recommended-vehicle-speed SET switch 42 has been operated by the driver responsively to the alarm for a predetermined elapsed time (e.g., several seconds), measured from the starting point of the alarm about the presence of the limited-vehicle-speed change in the forward traveling road, step S73 determines that the driver has operated recommended-vehicle-speed SET switch 42 responsively to the alarm. For instance, on-vehicle monitor 100 may be constructed by a touch-panel monitor configured to display a limited-vehicle-speed change. In such a case, a driver's push onto a screen that displays a limited vehicle speed in the touch-panel monitor, may be detected as a driver's recommended-vehicle-speed SET switch operation.

At step S74, a reservation for setting of set vehicle speed $V_{SET}$ to limited vehicle speed $V_{LIMIT}$ is made, and thereafter one execution cycle of the cruise vehicle speed setting processing of FIG. 10 terminates.

As previously discussed, when there is a limited-vehicle-speed change in the forward traveling road but the changed limited vehicle speed becomes less than the current set vehicle speed, or when there is no limited-vehicle-speed change in the forward traveling road, the routine proceeds from step S71 to step S63. At step S63 of the ACC system of the second embodiment shown in FIG. 10, in a similar manner to step S63 of the first embodiment shown in FIG. 6, a check is made to determine, based on the driver's recommended-vehicle-speed SET switch operation information (an operational signal) from recommended-vehicle-speed SET switch 42, whether recommended-vehicle-speed SET switch 42 is operated by the driver. When recommended-vehicle-speed SET switch 42 is operated by the driver, the routine proceeds from step S63 to step S43. Conversely when recommended-vehicle-speed SET switch 42 is not operated by the driver, the routine proceeds from step S63 to step S75.

At step S75, a check is made to determine whether a specified condition, which enables or permits setting of set vehicle speed $V_{SET}$ for the ACC function to limited vehicle speed $V_{LIMIT}$ (the limited vehicle speed of the driving lane on which the host vehicle is currently traveling), detected by the system (in particular, navigation device 20), is satisfied or unsatisfied. When the specified condition is satisfied, the routine proceeds from step S75 to step S43. Conversely when the specified condition is unsatisfied, one execution cycle of the cruise vehicle speed setting processing of FIG. 10 terminates.

Next at step S43, set vehicle speed $V_{SET}$ for the ACC function is set to the detected limited vehicle speed $V_{LIMIT}$.

Figure 12:
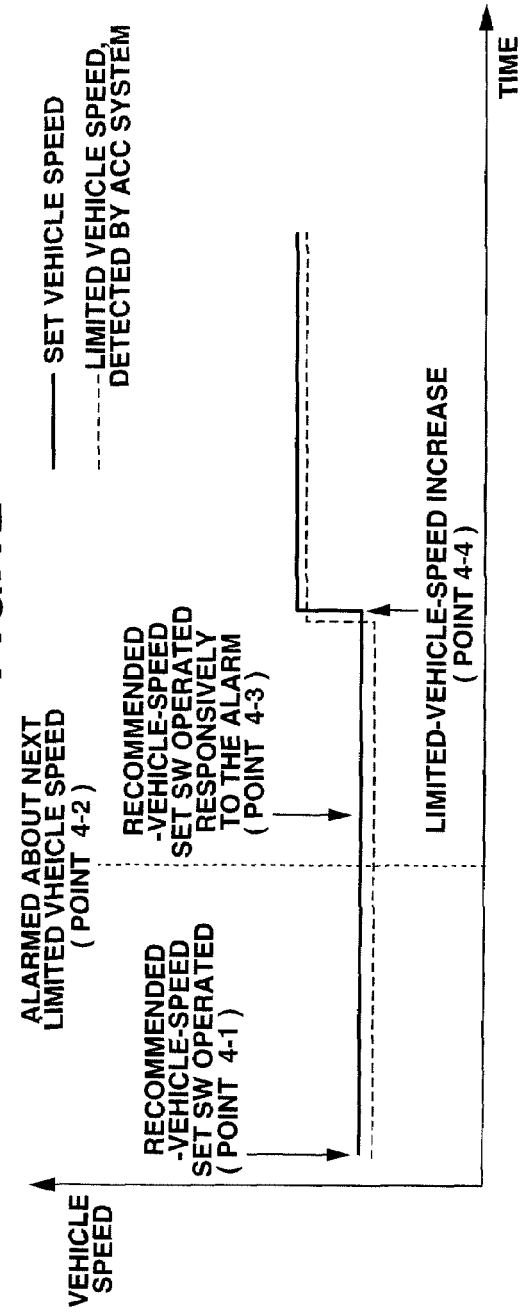
FIG. 12 is a time chart illustrating a condition for setting of set vehicle speed for the adaptive cruise traveling control function to limited vehicle speed, in the ACC system of the second embodiment.

The details of the specified condition (the enabling condition utilized at step S75) that enables setting of set vehicle speed $V_{SET}$ for the ACC function to limited vehicle speed $V_{LIMIT}$ are hereunder described in reference to the operational example indicated by the time chart of FIG. 12.

(4) The operational example concerning the specified condition (i.e., the enabling condition) that enables setting of set vehicle speed $V_{SET}$ for the ACC function to limited vehicle speed $V_{LIMIT}$, is defined by the following three items (i)-(iii):

(i) Recommended-vehicle-speed SET switch 42 is not operated by the driver at the current execution cycle, but the current set vehicle speed $V_{SET}$ for the ACC function has already been set to limited vehicle speed $V_{LIMIT}$ (the limited vehicle speed of the driving lane on which the host vehicle is currently traveling) by way of the previous recommended-vehicle-speed SET switch operation made by the driver at the previous execution cycle.

(ii) Thereafter, the driver operates recommended-vehicle-speed SET switch 42 responsively to an alarm about a limited-vehicle-speed change (i.e., a limited-vehicle-speed increase) in the forward traveling road, and thus a reservation for setting of set vehicle speed $V_{SET}$ to limited vehicle speed $V_{LIMIT}$ is made (see the flow from step S72 through step S73 to step S74 in FIG. 10).

(iii) Thereafter, the system detects an actual change (an actual increase) in limited vehicle speed $V_{LIMIT}$ of the present driving lane, on which the host vehicle is currently traveling, at the point of time when a transition to the next limited vehicle speed actually occurs, and thus the host vehicle begins to travel on the driving lane (having the next limited vehicle speed) just after the transition to the next limited vehicle speed.

(4-1) Point 4-1 of FIG. 12:

At the point of time 4-1, the ACC system of the second embodiment detects or determines, based on the driver's recommended-vehicle-speed SET switch operation information, that recommended-vehicle-speed SET switch 42 is currently operated by the driver, under a condition where the ACC function is deactivated (OFF). Thus, at the point 4-1, set vehicle speed $V_{SET}$ for the ACC function is set to limited vehicle speed $V_{LIMIT}$ and the ACC function becomes activated (ON) (see the flow defined by S31→S61→S62→S35 in FIG. 10 (FIG. 6)). Thus, at the point 4-1, by way of only the driver's recommended-vehicle-speed SET switch operation, the system enables switching of the ACC function from the deactivated (OFF) state to the activated (ON) state, and also enables setting of the set vehicle speed $V_{SET}$ (just after switched the ACC function ON) to limited vehicle speed $V_{LIMIT}$.

(4-2) Point 4-2 of FIG. 12:

At the point of time 4-2, the ACC system of the second embodiment detects or determines that a limited-vehicle-speed change (a limited-vehicle-speed increase) in the forward traveling road occurs, under the ACC-function activated (ON) state. Therefore, the driver is informed or alarmed about the changed limited vehicle speed (i.e., the increased limited vehicle speed) through on-vehicle monitor 100 (see the flow defined by S31→S36→S38→S41→S71→S72 in FIG. 10).

(4-3) Point 4-3 of FIG. 12:

At the point of time 4-3, the ACC system of the second embodiment detects or determines that the driver has operated recommended-vehicle-speed SET switch 42 responsively to the alarm about the limited-vehicle-speed increase in the forward traveling road. Thus, a reservation for setting of set vehicle speed $V_{SET}$ to the increased limited vehicle speed $V_{LIMIT}$ is made (see the flow defined by S73→S74 in FIG. 10).

(4-4) Point 4-4 of FIG. 12:

At the point of time 4-4 (i.e., at the point of time when a transition to the next limited vehicle speed (the increased limited vehicle speed) occurs), after a reservation for setting of set vehicle speed $V_{SET}$ to the increased limited vehicle speed $V_{LIMIT}$ has been made, the ACC system of the second embodiment has detected an actual increase in limited vehicle speed $V_{LIMIT}$ of the present driving lane (the present traveling road), on which the host vehicle is currently traveling. In other words, from the point 4-4, the host vehicle actually begins to travel on the driving lane just after the transition to the next limited vehicle speed (the increased limited vehicle speed). Therefore, set vehicle speed $V_{SET}$ is set to the increased limited vehicle speed $V_{LIMIT}$ (see the flow defined by S75→S43 in FIG. 10).

As set forth above, only when a reservation for setting of set vehicle speed $V_{SET}$ to limited vehicle speed $V_{LIMIT}$ has been made by the driver in advance, the system of the second embodiment permits set vehicle speed $V_{SET}$ to be changed or set to a new limited vehicle speed (i.e., an increased limited vehicle speed), synchronously with a limited-vehicle-speed change (i.e., a limited-vehicle-speed increase). In other words, when a reservation for setting of set vehicle speed $V_{SET}$ to limited vehicle speed $V_{LIMIT}$ hasn't been made by the driver in advance, the system of the second embodiment determines that the driver does not wish a set-vehicle-speed change or the driver does not wish a set-vehicle-speed change synchronously with a limited-vehicle-speed change. Thus, the system of the second embodiment inhibits set vehicle speed $V_{SET}$ from automatically following the changed limited vehicle speed (the increased limited vehicle speed), with no driver's reservation for setting of set vehicle speed $V_{SET}$ to limited vehicle speed $V_{LIMIT}$. Therefore, in automatically setting (following) of set vehicle speed $V_{SET}$ to the changed (increased) limited vehicle speed $V_{LIMIT}$, it is possible to optimally reflect a driver's wishes, in such a situation, that is, under the specified condition of the operational example (4), defined by the above three items (i)-(iii).

As previously described, the ACC system of the first embodiment enables or permits set vehicle speed $V_{SET}$ to be set or changed to limited vehicle speed $V_{LIMIT}$ (the limited vehicle speed of the driving lane on which the host vehicle is currently traveling) in accord with a driver's wishes in real time by virtue of a man-machine interface (recommended-vehicle-speed SET switch 42). In contrast, on the assumption that there is a limited-vehicle-speed change (a limited-vehicle-speed increase) in the forward traveling road, on which the host vehicle will travel soon, the ACC system of the second embodiment enables or permits set vehicle speed $V_{SET}$ to be set or changed to limited vehicle speed $V_{LIMIT}$ (the changed limited vehicle speed of the forward traveling road, on which the host vehicle will travel soon), in the presence of a reservation for setting of set vehicle speed $V_{SET}$ to limited vehicle speed $V_{LIMIT}$, made by the driver in advance.

The system of the second embodiment previously discussed in reference to the flowchart of FIG. 10, is configured to permit the flow from step S71 through steps S72-S73 to step S74, only under a condition that a limited-vehicle-speed change in the forward traveling road occurs and additionally the changed limited vehicle speed becomes greater than the current set vehicle speed (the current limited vehicle speed of the driving lane on which the host vehicle is currently traveling). In lieu thereof, the system of the second embodiment may be somewhat modified as follows.

That is, the modified ACC system may be configured to permit the flow from step S71 through steps S72-S73 to step S74, under a condition that a limited-vehicle-speed change in the forward traveling road occurs and additionally the changed limited vehicle speed becomes less than the current set vehicle speed (the current limited vehicle speed of the driving lane on which the host vehicle is currently traveling) as well as under a condition that a limited-vehicle-speed change in the forward traveling road occurs and additionally the changed limited vehicle speed becomes greater than the current set vehicle speed (the current limited vehicle speed). In such a case (that is, in the modified system), for instance, as clearly shown in FIG. 11, in the presence of a limited-vehicle-speed increase in the forward raveling road, increased limited-vehicle-speed information 100b is displayed on the upper portion of the right-hand side of the screen of on-vehicle monitor 100. Conversely, in the presence of a limited-vehicle-speed decrease in the forward raveling road, decreased limited-vehicle-speed information 100c is displayed on the lower portion of the right-hand side of the screen of on-vehicle monitor 100. In this case, it is more preferable to display the direction of the limited-vehicle-speed change by using a graphic symbol 100d, such as an upper arrow or a lower arrow, for the driver's good understanding. Furthermore, it is desirable to inform or alarm the driver about a limited-vehicle-speed change (a limited-vehicle-speed increase/decrease) by appropriately utilizing several display colors and/or alarming sounds.

As previously discussed in reference to the time chart of FIG. 12, as a prerequisite for executing a reservation for setting of set vehicle speed $V_{SET}$ to limited vehicle speed $V_{LIMIT}$, the system of the second embodiment uses a presupposition that recommended-vehicle-speed SET switch 42 has already been operated by the driver and thus set vehicle speed $V_{SET}$ has already been set to limited vehicle speed $V_{LIMIT}$ (see the point 4-1 in FIG. 12). Without using such a presupposition that set vehicle speed $V_{SET}$ has already been set to limited vehicle speed $V_{LIMIT}$, a reservation for setting of set vehicle speed $V_{SET}$ to limited vehicle speed $V_{LIMIT}$ may be executed. In such a case, as a prerequisite for executing a reservation for setting of set vehicle speed $V_{SET}$ to limited vehicle speed $V_{LIMIT}$, the ACC system may use at least a presupposition that the ACC function has already been activated (ON). Under such a presupposition (that is, in the ACC-function activated state), the system executes a reservation for setting (or changing) of set vehicle speed $V_{SET}$ to limited vehicle speed $V_{LIMIT}$, when the driver has operated recommended-vehicle-speed SET switch 42 responsively to an alarm about a limited-vehicle-speed change in the forward traveling road (see the flow from step S71 through steps S72-S73 to step S74 in FIG. 10). At this point of time when such a reservation for changing set vehicle speed $V_{SET}$ has been made with recommended-vehicle-speed SET switch 42 operated by the driver responsively to the alarm, set vehicle speed $V_{SET}$ is set to the previous set vehicle speed $V_{SET(OLD)}$ set with the ACC function activated previously, or to the host vehicle speed V at the point of time when a transition to the ACC-function activated state has occurred. Thereafter, when the ACC system has detected an actual change in limited vehicle speed $V_{LIMIT}$ of the present driving lane (the present traveling road), the ACC system permits set vehicle speed $V_{SET}$ to be changed from the previous set vehicle speed $V_{SET(OLD)}$ or the host vehicle speed V to the changed limited vehicle speed (the next limited vehicle speed) (see the flow from step S75 to step S43 in FIG. 10).

(Operations and Effects)

(1) According to the ACC system of the second embodiment, when limited vehicle speed $V_{LIMIT}$ (i.e., a next limited vehicle speed) in the forward traveling road changes from the current limited vehicle speed $V_{LIMIT}$ of the driving lane, on which the host vehicle is currently traveling, the system informs or alarms the driver about such a limited-vehicle-speed change in advance. Additionally, the system permits ACC desired vehicle speed $V_T$ to follow the next limited vehicle speed immediately when the system has detected an actual change in limited vehicle speed $V_{LIMIT}$ just after the transition to the next limited vehicle speed $V_{LIMIT(NEW)}$ in the presence of the driver's recommended-vehicle-speed SET switch operation responsively to the alarm and thus the host vehicle begins to travel on the driving lane just after the transition to the next limited vehicle speed $V_{LIMIT(NEW)}$. Thus, the system of the second embodiment permits ACC desired vehicle speed $V_T$ to automatically follow the next limited vehicle speed just after a limited-vehicle-speed change, in accord with a driver's wishes, in other words, in the presence of a driver's reservation for setting of set vehicle speed $V_{SET}$ to limited vehicle speed $V_{LIMIT}$ (i.e., in the presence of a driver's recommended-vehicle-speed SET switch operation responsively to an alarm about a limited-vehicle-speed increase in the forward traveling road).

Third Embodiment

Figure 13A:
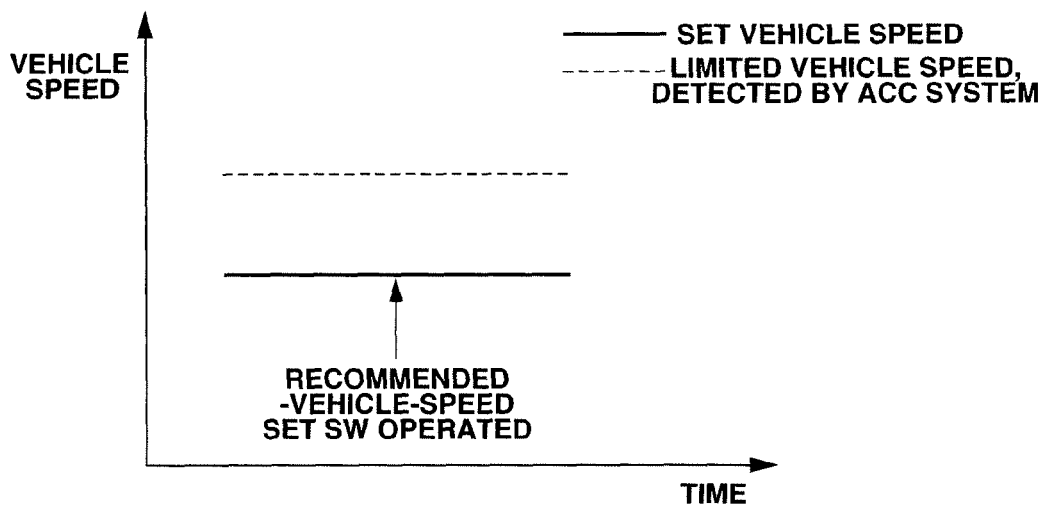
FIGS. 13A-13B are time charts illustrating conditions for setting of set vehicle speed for the adaptive cruise traveling control function to limited vehicle speed, in the ACC system of the third embodiment.
Figure 13B:
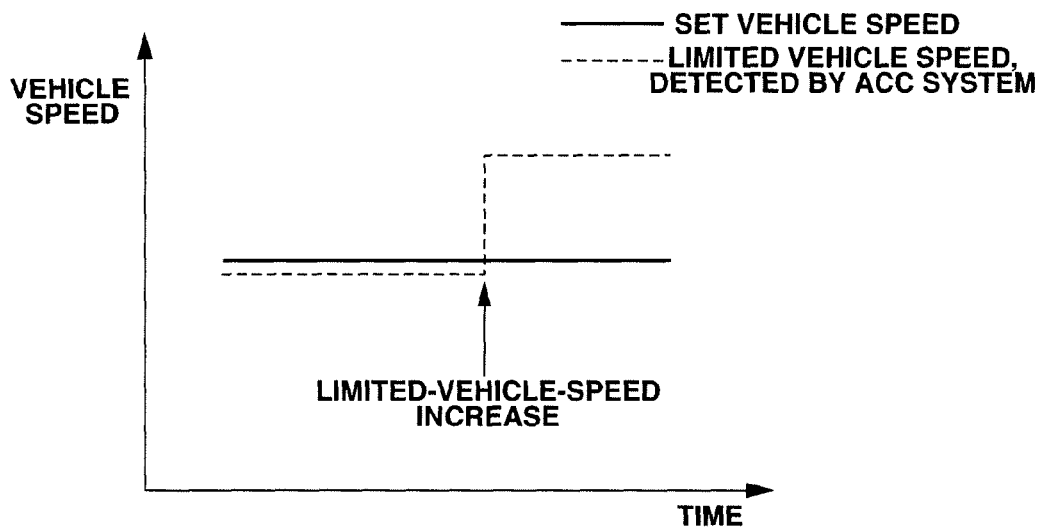

Basically, the system configuration of the ACC system of the third embodiment is similar to that of the first embodiment, but the procedure executed within cruise vehicle speed setting section 40 of the ACC system of the third embodiment is somewhat different from the procedure (see the specified condition for setting of set vehicle speed $V_{SET}$ to limited vehicle speed $V_{LIMIT}$ at step S64) executed within cruise vehicle speed setting section 40 of the ACC system of the first embodiment, as hereunder described in detail in reference to the time charts of FIGS. 13A-13B.

Briefly speaking, under a specified condition (under an inhibiting condition described later by reference to the time charts of FIGS. 13A-13B), the ACC system of the third embodiment is configured to determine, based on preceding vehicle information (e.g., the preceding vehicle acquisition flag, speed difference Vd between the host vehicle speed V and the preceding vehicle speed Vf, and vehicle-to-vehicle distance D between the preceding vehicle and the host vehicle) obtained by preceding vehicle information processing section 32, whether setting of set vehicle speed $V_{SET}$ to limited vehicle speed $V_{LIMIT}$ should be inhibited. Concretely, the specified condition (the inhibiting condition) contains at least one of (i) a first condition that the preceding vehicle acquisition flag is set (=1) and thus preceding vehicle information acquisition section 30 is recognizing or detecting the preceding vehicle traveling ahead of the host vehicle, and (ii) a second condition that the host vehicle follows the preceding vehicle, keeping the host vehicle's distance from the preceding vehicle at an approximately constant vehicle-to-vehicle distance D.

As seen from the time chart of FIG. 13A, if recommended-vehicle-speed SET switch 42 is operated by the driver under the specified condition that at least one of the previously-noted first and second conditions is satisfied in a situation where limited vehicle speed $V_{LIMIT}$ is kept at a speed value, which is higher than the current set vehicle speed $V_{SET}$ (e.g., the host vehicle speed at the point of time when the ACC function has been switched ON), then the ACC system of the third embodiment invalidates this driver's recommended-vehicle-speed SET switch operation. That is, as appreciated from the time chart of FIG. 13A, under the specified condition, the system inhibits (disables) setting of set vehicle speed $V_{SET}$ for the ACC function to limited vehicle speed $V_{LIMIT}$ even in the presence of the driver's recommended-vehicle-speed SET switch operation. As a result, set vehicle speed $V_{SET}$ is retained unchanged (i.e., kept at the set vehicle speed just before the driver's recommended-vehicle-speed SET switch operation).

As seen from the time chart of FIG. 13B, if a limited-vehicle-speed increase occurs under the specified condition that at least one of the previously-noted first and second conditions is satisfied during the host vehicle's traveling at the current set vehicle speed $V_{SET}$ already set to limited vehicle speed $V_{LIMIT}$, then the ACC system of the third embodiment inhibits set vehicle speed $V_{SET}$ for the ACC function from automatically following the limited-vehicle-speed increase, thus temporarily disabling setting of set vehicle speed $V_{SET}$ to limited vehicle speed $V_{LIMIT}$. As a result, set vehicle speed $V_{SET}$ is retained unchanged (i.e., kept at the limited vehicle speed just before the limited-vehicle-speed increase occurs).

Concretely, the system of the third embodiment determines, based on the preceding vehicle information (in particular, the preceding vehicle acquisition flag, vehicle-to-vehicle distance D, and speed difference Vd), whether the specified condition (the inhibiting condition) is satisfied or unsatisfied. More concretely, the system retains set vehicle speed $V_{SET}$ unchanged, under a specified condition where the preceding vehicle acquisition flag is set (=1) and thus the preceding vehicle, existing ahead of the host vehicle, has been recognized or detected and vehicle-to-vehicle distance D is less than a predetermined threshold value. Also, the system retains set vehicle speed $V_{SET}$ unchanged, under a specified condition where the preceding vehicle acquisition flag is set (=1) and thus the preceding vehicle has been recognized or detected and the host vehicle is traveling at the same speed (speed difference Vd=0) as the preceding vehicle or the host vehicle is approaching the preceding vehicle.

As discussed above, when the previously-noted inhibiting condition is satisfied, the ACC system of the third embodiment inhibits setting of set vehicle speed $V_{SET}$ to limited vehicle speed $V_{LIMIT}$, which setting causes the ACC vehicle speed (host vehicle speed V) to increase. This avoids the host vehicle from undesirably approaching close to the preceding vehicle, thereby preventing the ill-timed setting of set vehicle speed $V_{SET}$ to limited vehicle speed $V_{LIMIT}$ in the ACC-function activated state from causing the driver to feel considerable discomfort.

(Operations and Effects)

(1) According to the ACC system of the third embodiment, in a situation where there is a high possibility that setting of ACC desired vehicle speed $V_T$ to limited vehicle speed $V_{LIMIT}$ causes the host vehicle to undesirably approach close to the preceding vehicle, the system inhibits setting of ACC desired vehicle speed $V_T$ to limited vehicle speed $V_{LIMIT}$. That is, under the previously-noted inhibiting condition, the system of the third embodiment effectively suppresses or avoids speed adjustment (speed control) of host vehicle speed V to limited vehicle speed $V_{LIMIT}$, which speed adjustment causes the host vehicle to accelerate, thereby reliably preventing the host vehicle from undesirably approaching closer to the preceding vehicle.

Fourth Embodiment

Figure 14:
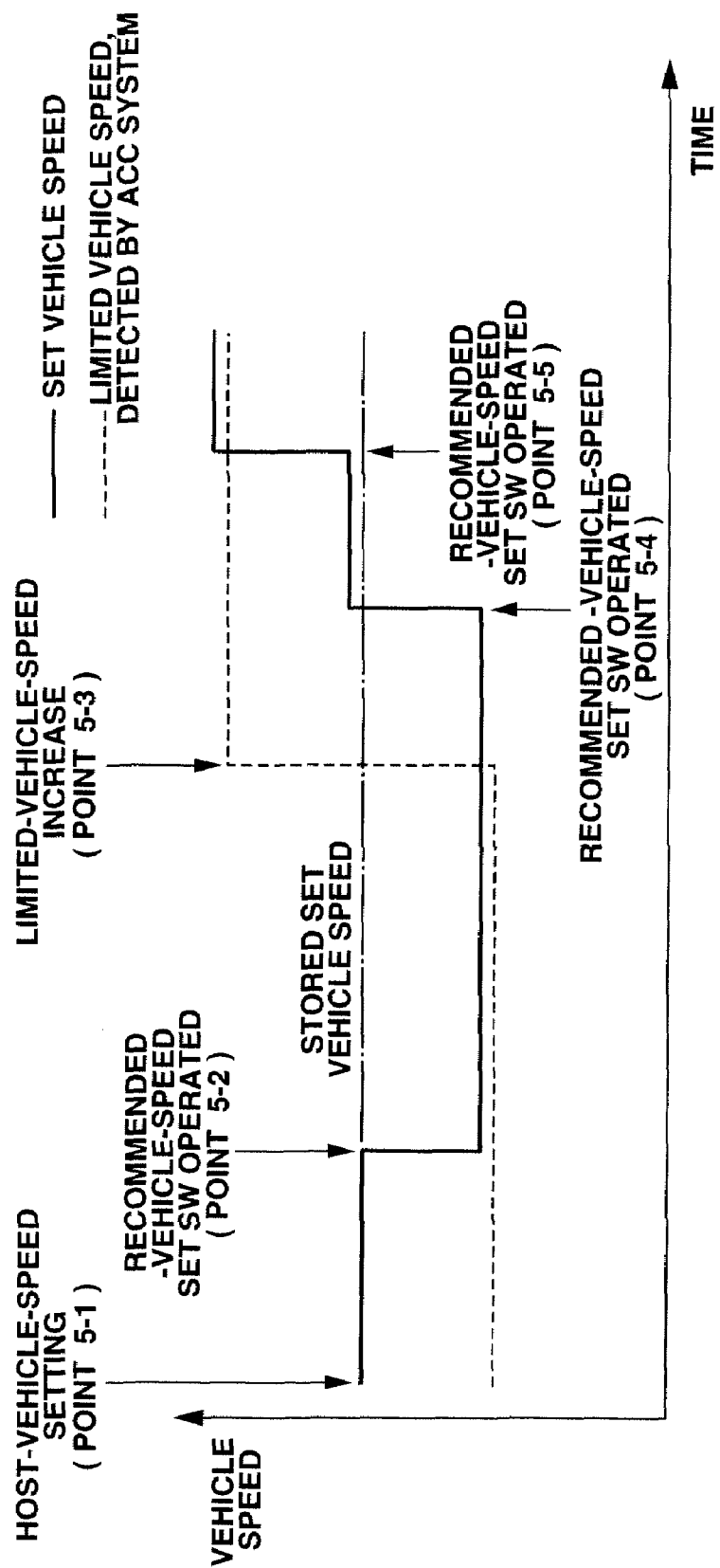
FIG. 14 is a time chart illustrating a condition for setting of set vehicle speed for the adaptive cruise traveling control function to limited vehicle speed, in the ACC system of the fourth embodiment.

Basically, the system configuration of the ACC system of the fourth embodiment is similar to that of the first embodiment, but the procedure (a method for setting or changing set vehicle speed $V_{SET}$) executed within cruise vehicle speed setting section 40 of the ACC system of the fourth embodiment is somewhat different from the procedure (see the method for setting or changing set vehicle speed $V_{SET}$ at step S64) executed within cruise vehicle speed setting section 40 of the ACC system of the first embodiment, as hereunder described in detail in reference to the time chart of FIG. 14.

Briefly speaking, the ACC system of the fourth embodiment is configured to store set vehicle speed $V_{SET}$ at the point of time when recommended-vehicle-speed SET switch 42 has been operated by the driver. That is, as a set vehicle speed value just before setting (or changing) set vehicle speed $V_{SET}$ to limited vehicle speed $V_{LIMIT}$, the system stores the previous set vehicle speed $V_{SET(OLD)}$ set with the ACC function activated previously, or the host vehicle speed V at the point of time when a transition to the ACC-function activated state has occurred. Thereafter, in setting of set vehicle speed $V_{SET}$ to limited vehicle speed $V_{LIMIT}$ (the changed limited vehicle speed or the next limited vehicle speed $V_{LIMIT(NEW)}$), the system of the fourth embodiment executes the setting or changing operation of set vehicle speed $V_{SET}$, by reference to the stored set vehicle speed $V_{SET(OLD)}$. The processing or method for setting set vehicle speed $V_{SET}$ for the ACC function to limited vehicle speed $V_{LIMIT}$, executed by the system of the fourth embodiment, fully taking into account the stored set vehicle speed, is hereunder explained in reference to the time chart of FIG. 14.

(5-1) Point 5-1 of FIG. 14:

In a similar manner to the point 1-1 of FIG. 7, at the point of time 5-1 of FIG. 14, the ACC system of the fourth embodiment detects or determines, based on the driver's set-vehicle-speed-SET-switch operation information, that set-vehicle-speed SET switch 41 is currently operated by the driver and the driver's set-vehicle-speed SET switch operation is the driver-operated host-vehicle-speed setting, under a condition where the ACC function is deactivated (OFF). Thus, at the point 5-1, set vehicle speed $V_{SET}$ for the ACC function is set to the host vehicle speed and the ACC function becomes activated (ON) (see the flow defined by S31→S61→S34→S35 in FIG. 6).

(5-2) Point 5-2 of FIG. 14:

At the point of time 5-2, the ACC system of the embodiment detects or determines, based on the driver's recommended-vehicle-speed SET switch operation information, that recommended-vehicle-speed SET switch 42 is currently operated by the driver, under a condition where the ACC function is activated (ON). Thus, at the point 5-2, set vehicle speed $V_{SET}$ for the ACC function is set to limited vehicle speed $V_{LIMIT}$ (see the flow from step S63 to step S43 in FIG. 6). At this time, the system of the fourth embodiment is further configured to store and retain the set vehicle speed just before a change of set vehicle speed $V_{SET}$ to limited vehicle speed $V_{LIMIT}$, which change is triggered by the driver's recommended-vehicle-speed SET switch operation, (for example, the host vehicle speed V set previously by the driver-operated host-vehicle-speed setting), in a storage medium (storing means), such as a memory. For instance, such additional processing (a storing process) may be added to the process of step S43 as previously discussed. The somewhat modified step S43 is hereinafter referred to as "modified step S43'".

(5-3) Point 5-3 of FIG. 14:

In a similar manner to the point 1-4 of FIG. 7, at the point of time 5-3 of FIG. 14, the ACC system of the fourth embodiment detects or determines that a limited-vehicle-speed change (a change in limited vehicle speed $V_{LIMIT}$ of the driving lane on which the host vehicle is currently traveling) occurs under a condition where set vehicle speed $V_{SET}$ has been set or switched to limited vehicle speed $V_{LIMIT}$, but the detected limited-vehicle-speed change is a limited-vehicle-speed increase. Thus, at the point 5-3, set vehicle speed $V_{SET}$ for the ACC function is retained unchanged (i.e., kept at the limited vehicle speed just before the limited-vehicle-speed increase) (see the termination of one cycle of the routine after the flow to step S64 in FIG. 6). That is, the ACC system of the fourth embodiment retains set vehicle speed $V_{SET}$ unchanged, without permitting set vehicle speed $V_{SET}$ to follow limited vehicle speed $V_{LIMIT}$, in the presence of such a limited-vehicle-speed increase.

(5-4) Point 5-4 of FIG. 14:

At the point of time 5-4 of FIG. 14, the ACC system of the fourth embodiment detects or determines, based on the driver's recommended-vehicle-speed SET switch operation information, that recommended-vehicle-speed SET switch 42 is currently operated by the driver, in the ACC-function activated (ON) state. Thus, at the point 5-4, set vehicle speed $V_{SET}$ for the ACC function is set to limited vehicle speed $V_{LIMIT}$ (see the flow from step S63 of FIG. 6 to the modified step S43'). At this time, the system of the fourth embodiment is further configured to compare the previously-stored set vehicle speed value $V_{SET(OLD)}$ with the changed limited vehicle speed (the next limited vehicle speed $V_{LIMIT(NEW)}$). When the changed limited vehicle speed $V_{LIMIT(NEW)}$ is greater than the previously-stored set vehicle speed value $V_{SET(OLD)}$, set vehicle speed $V_{SET}$ for the ACC function is set or changed or returned to the previously-stored set vehicle speed value $V_{SET(OLD)}$, which has been determined at the previous execution cycle with driver intervention. Such changing or returning of set vehicle speed $V_{SET}$ to the previously-stored set vehicle speed value, which has been determined at the previous execution cycle with driver intervention, matches or coincides with a driver's wishes. According to the system of the fourth embodiment, if a limited-vehicle-speed increase occurs under a condition where set vehicle speed $V_{SET}$ has already been set or switched to limited vehicle speed $V_{LIMIT}$ and thereafter the driver operates recommended-vehicle-speed SET switch 42, then the system of the fourth embodiment changes or returns set vehicle speed $V_{SET}$ to the previously-stored set vehicle speed value $V_{SET(OLD)}$, which has been determined at the previous execution cycle with driver intervention. In this manner, the first recommended-vehicle-speed SET switch operation made by the driver after the limited-vehicle-speed increase, permits the host vehicle to travel once at the same speed as the previous set vehicle speed value $V_{SET(OLD)}$, which has been determined at the previous execution cycle with driver intervention, thus satisfactorily reflecting the driver's wishes.

In the previously-discussed fourth embodiment, when the changed limited vehicle speed $V_{LIMIT(NEW)}$ is greater than the previously-stored set vehicle speed value $V_{SET(OLD)}$, set vehicle speed $V_{SET}$ for the ACC function is changed or returned to the previously-stored set vehicle speed value $V_{SET(OLD)}$. Conversely when the changed limited vehicle speed $V_{LIMIT(NEW)}$ is less than the previously-stored set vehicle speed value $V_{SET(OLD)}$, set vehicle speed $V_{SET}$ for the ACC function is set to the changed limited vehicle speed $V_{LIMIT(NEW)}$. That is, it is preferable to select a smaller one of the changed limited vehicle speed $V_{LIMIT(NEW)}$ and the previously-stored set vehicle speed value $V_{SET(OLD)}$ as a new set vehicle speed $V_{SET(NEW)}$ for the ACC function, by way of a so-called select-LOW process $MIN(V_{LIMIT(NEW)}, V_{SET(OLD)})$. That is, if a limited-vehicle-speed increase occurs but the increased limited vehicle speed $V_{LIMIT(NEW)}$ is kept at a speed value, which is less than the previously-stored set vehicle speed value $V_{SET(OLD)}$, then the system of the fourth embodiment sets or changes set vehicle speed $V_{SET}$ to the increased limited vehicle speed $V_{LIMIT(NEW)}$.

(5-5) Point 5-5 of FIG. 14:

At the point of time 5-5 of FIG. 14, the ACC system of the fourth embodiment detects or determines, based on the driver's recommended-vehicle-speed SET switch operation information, that recommended-vehicle-speed SET switch 42 is currently operated by the driver, in the ACC-function activated (ON) state. Thus, at the point 5-5, set vehicle speed $V_{SET}$ for the ACC function is set to the changed limited vehicle speed $V_{LIMIT(NEW)}$ by way of the second recommended-vehicle-speed SET switch operation made by the driver after the limited-vehicle-speed increase (see the flow from step S63 of FIG. 6 to the modified step S43'). As set forth above, even when set vehicle speed $V_{SET}$ has been changed or returned to the previously-stored set vehicle speed value $V_{SET(OLD)}$ (see the point 5-4 in FIG. 14), the system of the fourth embodiment enables set vehicle speed $V_{SET}$ to be set to the changed limited vehicle speed $V_{LIMIT(NEW)}$ (see the point 5-5 in FIG. 14) by way of only the further recommended-vehicle-speed SET switch operation made by the driver after the limited-vehicle-speed increase.

(Operations and Effects)

(1) According to the ACC system of the fourth embodiment, when ACC desired vehicle speed $V_T$ is changed or set from set vehicle speed $V_{SET}$ to limited vehicle speed $V_{LIMIT}$, whose speed value is less than the set vehicle speed, the set vehicle speed is stored. Thereafter, suppose that a limited-vehicle-speed increase occurs and the increased limited vehicle speed $V_{LIMIT(NEW)}$ becomes higher than the stored set vehicle speed value $V_{SET(OLD)}$, and thereafter the system detects the first driver's recommended-vehicle-speed SET switch operation after the limited-vehicle-speed increase. At this time, the system changes or returns ACC desired vehicle speed $V_T$ to the stored set vehicle speed value $V_{SET(OLD)}$. Thereafter, when the system detects the further driver's recommended-vehicle-speed SET switch operation subsequently to the first driver's recommended-vehicle-speed SET switch operation after the limited-vehicle-speed increase, the system permits ACC desired vehicle speed $V_T$ to be changed or set to the changed limited vehicle speed $V_{LIMIT(NEW)}$ after the limited-vehicle-speed increase. This enables setting of ACC desired vehicle speed $V_T$ in accord with a driver's wishes.

The entire contents of Japanese Patent Application No. 2007-203232 (filed Aug. 3, 2007) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An apparatus for controlling traveling of a vehicle, comprising:
   a set vehicle speed detector configured to detect a set vehicle speed;
   a limited vehicle speed detector configured to detect a limited vehicle speed of a road, on which a host vehicle is traveling;
   a first man-machine interface configured to set the set vehicle speed;
   a second man-machine interface configured to set a desired vehicle speed to the limited vehicle speed manually by a driver's operation made to the second man-machine interface;
   a driver's operation detector configured to detect driver's operation made to the man-machine interfaces;
   a desired vehicle speed setting section configured to set the desired vehicle speed basically to the set vehicle speed, and also configured to set the desired vehicle speed to the limited vehicle speed, based on a result of detection of the driver's operation made to the second man-machine interface, under a condition where the limited vehicle speed has been detected by the limited vehicle speed detector; and
   a control device configured to control a speed of the host vehicle in a manner so as to bring the host vehicle speed closer to the desired vehicle speed,
   wherein said apparatus is configured to determine, based on an operational signal from the first man-machine interface and an operational signal from the second man-machine interface, whether either the first man-machine interface or the second man-machine interface is operated by the driver.

2. An apparatus for controlling traveling of a vehicle, comprising:
   a set vehicle speed detector configured to detect a set vehicle speed;
   a limited vehicle speed detector configured to detect a limited vehicle speed of a road, on which a host vehicle is traveling;
   a first man-machine interface configured to set the set vehicle speed;
   a second man-machine interface configured to set a desired vehicle speed to the limited vehicle speed manually by a driver's operation made to the second man-machine interface;
   a driver's operation detector configured to detect driver's operation made to the man-machine interfaces;
   a desired vehicle speed setting section configured to set the desired vehicle speed basically to the set vehicle speed, and also configured to set the desired vehicle speed to the limited vehicle speed, based on a result of detection of the driver's operation made to the second man-machine interface, under a condition where the limited vehicle speed has been detected by the limited vehicle speed detector; and
   a control device configured to control a speed of the host vehicle in a manner so as to bring the host vehicle speed closer to the desired vehicle speed,
   wherein the desired vehicle speed setting section sets the desired vehicle speed to the limited vehicle speed, at a point of time when the driver's operation made to the second man-machine interface has been detected, under the condition where the limited vehicle speed has been detected by the limited vehicle speed detector.

3. The apparatus as claimed in claim 2, wherein:
   the desired vehicle speed setting section permits the desired vehicle speed to automatically follow a decrease in the limited vehicle speed, at a point of time when the decrease in the limited vehicle speed occurs, under a condition where the desired vehicle speed has already been set to the limited vehicle speed.

4. The apparatus as claimed in claim 2, wherein:
   the desired vehicle speed setting section inhibits the desired vehicle speed from automatically following an increase in the limited vehicle speed, at a point of time when the increase in the limited vehicle speed occurs, under a condition where the desired vehicle speed has already been set to the limited vehicle speed.

5. The apparatus as claimed in claim 1, wherein:
   the desired vehicle speed setting section automatically sets the desired vehicle speed to the limited vehicle speed, at a point of time when a decrease in the limited vehicle speed occurs and the decreased limited vehicle speed becomes less than the set vehicle speed, under a condition where an alteration in the desired vehicle speed to the set vehicle speed, which is lower than the limited vehicle speed, has been made after temporary setting of the desired vehicle speed to the limited vehicle speed due to the driver's operation made to the second man-machine interface.

6. The apparatus as claimed in claim 1, further comprising:
an alarming device configured to give an alarm about a change in the limited vehicle speed, occurring in a road in front of the host vehicle, in advance, when the change in the limited vehicle speed has been detected by the limited vehicle speed detector,
wherein the desired vehicle speed setting section permits the desired vehicle speed to automatically follow the changed limited vehicle speed, at a point of time when the host vehicle begins to travel on the road of the changed limited vehicle speed, under a condition where the driver's operation have been made to the second man-machine interface responsively to the alarm.

7. The apparatus as claimed in claim 1, further comprising:
a storage medium configured to store a value of the set vehicle speed, at a point of time when an alteration of the desired vehicle speed to the limited vehicle speed, which is lower than the set vehicle speed, has been triggered by the driver's operation made to the second man-machine interface,
wherein the desired vehicle speed setting section is further configured to set the desired vehicle speed to the stored set vehicle speed value, responsively to detection of a first driver's operation made to the second man-machine interface under a condition where an increase in the limited vehicle speed occurs after the alteration of the desired vehicle speed to the limited vehicle speed and the increased limited vehicle speed becomes greater than the stored set vehicle speed value, and to set the desired vehicle speed to the increased limited vehicle speed responsively to detection of a further driver's operation made to the second man-machine interface, subsequently to the first driver's operation.

8. The apparatus as claimed in claim 1, further comprising:
a storage medium configured to store a value of the set vehicle speed, at a point of time when an alteration of the desired vehicle speed to the limited vehicle speed, which is lower than the set vehicle speed, has been triggered by the driver's operation made to the second man-machine interface,
wherein, under a condition where an increase in the limited vehicle speed occurs after the alteration of the desired vehicle speed to the limited vehicle speed, the desired vehicle speed setting section is further configured to set the desired vehicle speed to a smaller one of the stored set vehicle speed value and the increased limited vehicle speed, responsively to detection of the driver's operation made to the second man-machine interface after the increase in the limited vehicle speed.

9. The apparatus as claimed in claim 1, wherein:
the desired vehicle speed setting section inhibits the desired vehicle speed from being set to the limited vehicle speed, regardless of the driver's operation made to the second man-machine interface, when setting of the desired vehicle speed to the limited vehicle speed causes the host vehicle to approach close to a preceding vehicle, which travels ahead of the host vehicle.

10. An apparatus for controlling traveling of a vehicle, comprising:
set vehicle speed detection means for detecting a set vehicle speed;
limited vehicle speed detection means for detecting a limited vehicle speed of a road, on which a host vehicle is traveling;
first operating means for setting the set vehicle speed;
second operating means for setting a desired vehicle speed for an adaptive cruise traveling control function to the limited vehicle speed manually by a driver's operation made to the second operating means;
driver's operation detection means for detecting driver's operation made to each of the first and second operating means;
desired vehicle speed setting means for setting, at a first speed-control mode, the desired vehicle speed basically to the set vehicle speed, and for setting, at a second speed-control mode, the desired vehicle speed to the limited vehicle speed, based on a result of detection of the driver's operation made to the second operating means, under a condition where the limited vehicle speed has been detected by the limited vehicle speed detection means; and
control means for controlling a speed of the host vehicle in a manner so as to bring the host vehicle speed closer to the desired vehicle speed,
wherein said apparatus is configured to determine, based on an operational signal from the first operating means and an operational signal from the second operating means, whether either the first operating means or the second operating means is operated by the driver.

11. A method of controlling traveling of a vehicle, comprising:
controlling a speed of a host vehicle at a basic speed-control mode that brings the host vehicle speed closer to a desired vehicle speed for an adaptive cruise traveling control function, setting a set vehicle speed as the desired vehicle speed by a first man-machine interface;
controlling the host vehicle speed at a driver-intervention speed-control mode that brings the host vehicle speed closer to the desired vehicle speed, setting a limited vehicle speed of a road, on which the host vehicle is traveling, as the desired vehicle speed, when the desired vehicle speed has been set to the limited vehicle speed manually by a driver's operation made to a second man-machine interface, under a condition where the limited vehicle speed has been detected; and
determining, based on an operational signal from the first man-machine interface and an operational signal from the second man-machine interface, whether either the first man-machine interface or the second man-machine interface is operated by the driver.

\* \* \* \* \*